(12) United States Patent
Nelson et al.

(10) Patent No.: US 6,270,104 B1
(45) Date of Patent: Aug. 7, 2001

(54) COMPOSITE BICYCLE FRAME AND METHODS FOR ITS CONSTRUCTION

(75) Inventors: Ronald H. Nelson; Dimitrije Milovich, both of Salt Lake City, UT (US); Weston M. Wilcox, Sun Prairie; Robert F. Read, Edgerton, both of WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 08/134,916

(22) Filed: Oct. 8, 1993

Related U.S. Application Data

(62) Division of application No. 07/890,933, filed on May 29, 1992, now abandoned.

(51) Int. Cl.$^7$ .............................. B62K 19/16; B62K 19/30
(52) U.S. Cl. ....................................... 280/281.1; 280/288.3
(58) Field of Search .............................. 280/281.1, 288.3, 280/274; 156/156; 403/265, 268, 292, 295; 264/258

(56) References Cited

U.S. PATENT DOCUMENTS

| | | | |
|---|---|---|---|
| 2,080,698 | * 5/1937 | Clark | 280/281.1 |
| 4,479,662 | * 10/1984 | Dufour et al. | 280/274 |
| 4,657,795 | * 4/1987 | Foret | 280/281.1 |

(List continued on next page.)

FOREIGN PATENT DOCUMENTS

| | | | |
|---|---|---|---|
| 2248807 | * 4/1992 | (GB) | 280/281.1 |
| 3185615 | * 8/1988 | (JP) | 280/281.1 |
| 0158483 | * 6/1990 | (JP) | 280/281.1 |

OTHER PUBLICATIONS

*Bicycling* magazine, Mar., 1989, "New Products" column, pp. 46 and 50, "Trek 5000".

(List continued on next page.)

*Primary Examiner*—Anne Marie Boehler
(74) *Attorney, Agent, or Firm*—Lee, Mann, Smith, McWilliams, Sweeney & Ohlson

(57) ABSTRACT

The bicycle frame of the invention is formed by selecting and adhesively joining previously formed and precured composite tubes to previously formed and precured composite lug components. The precured lug components are separately shaped from preforms comprising a plurality of resin impregnated fibrous layers formed into a stack in which the fibers of adjacent layers cross one another, with such preforms of each such lug component being in the nature of a set of similarly shaped overlapping halves of the frame lug component to be formed therefrom, with such overlapping halves being brought together in a hollow nature and placed around an inflatable bladder to form an assemblage that is applied between a set of female mold halves of molding tools that are closed for forming the lug component itself, and the resulting assemblage is subjected to a curing heat, with such bladder of each two hundred (200) set of preforms being arranged to first be pressurized to a pressure greater than or equal to two hundred (200) pounds per square inch, for urging the respective preforms against the mold shaping surfaces opposing same, thereby providing a high laminate compaction pressure during cure that produces a uniform, thin walled, strong, tubular, lug component. The said lug components are also each formed with one or more male members or plugs for closely fitting into adjacent open ends of the aforementioned all-composite tubes. Such composite tubes are formed by wrapping a preform, that is similar to the lug component preform, around a mandrel and cured, with the wrap being subject to a compaction pressure therearound during cure, thereby providing a thin walled high strength tube, for forming of the bicycle frame as above indicated.

23 Claims, 9 Drawing Sheets

U.S. PATENT DOCUMENTS

| | | | |
|---|---|---|---|
| 4,900,048 | * | 2/1990 | Derujinsky .......................... 280/281.1 |
| 4,900,049 | * | 2/1990 | Tseng ................................. 280/281.1 |
| 4,986,949 | * | 1/1991 | Trimble ............................... 264/258 |
| 5,018,900 | * | 5/1991 | Darrin ................................. 403/267 |
| 5,076,601 | * | 12/1991 | Duplessis .......................... 280/281.1 |
| 5,116,071 | * | 5/1992 | Calfee ............................... 280/281.1 |
| 5,181,732 | * | 1/1993 | Bezin et al. ...................... 280/281.1 |
| 5,351,980 | * | 10/1994 | Huang ............................... 280/281.1 |

OTHER PUBLICATIONS

*Bicycling* magazine, Mar., 1989, "Bike Tech" column, pp. 204 and 206, "Inside The Kestrel MX–Z".

*Advanced Composites*, Jan./Feb., 1987, pp. 40–42, 44 and 46, "Bicycling With Advanced Composites".

*TREK®* 1990 Authorized Dealer catalog page 6 showing "investment cast lugs . . . " (photo bottom center page).

* cited by examiner

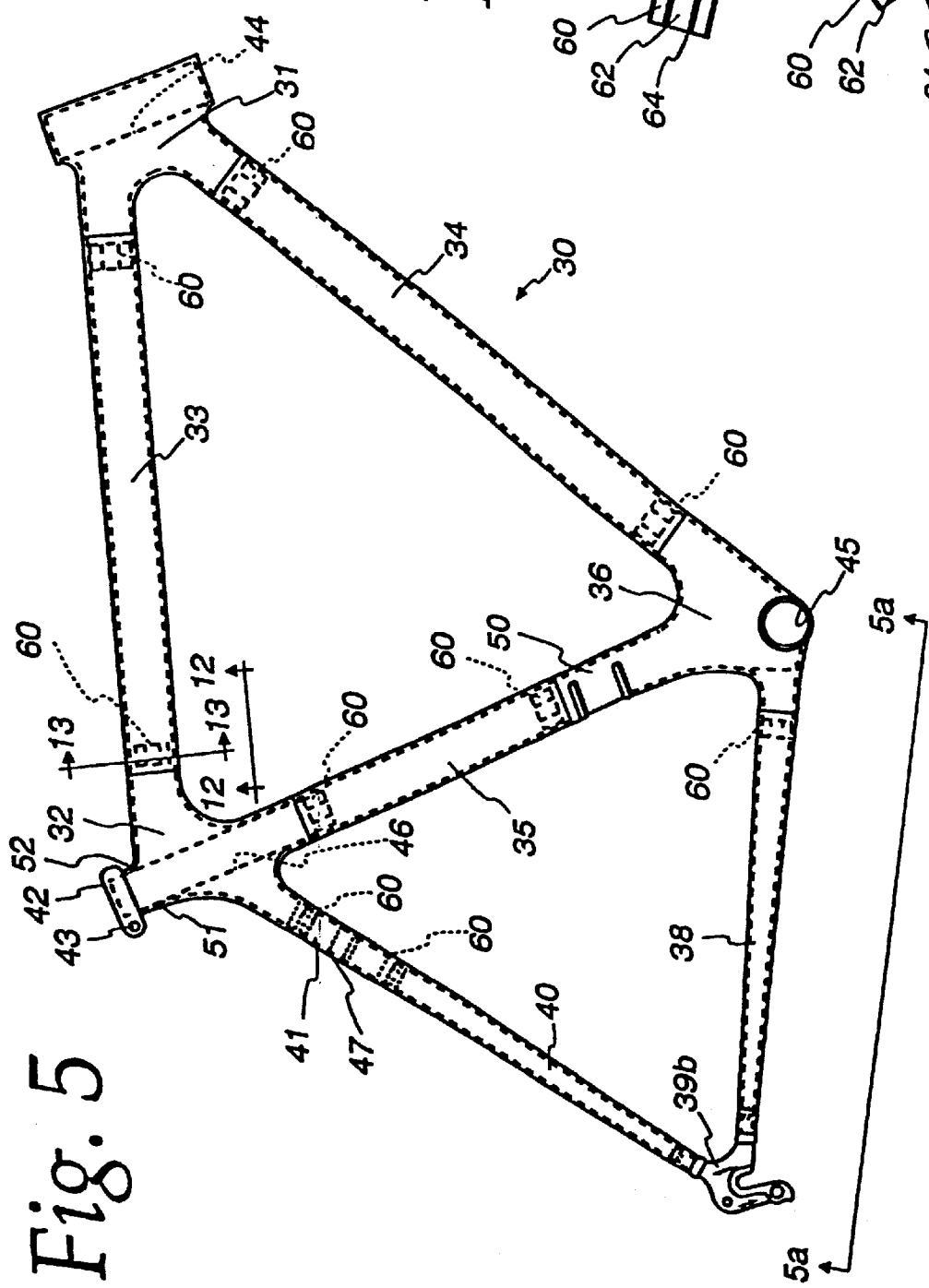
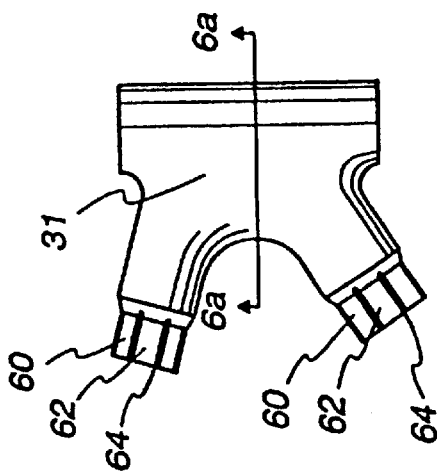

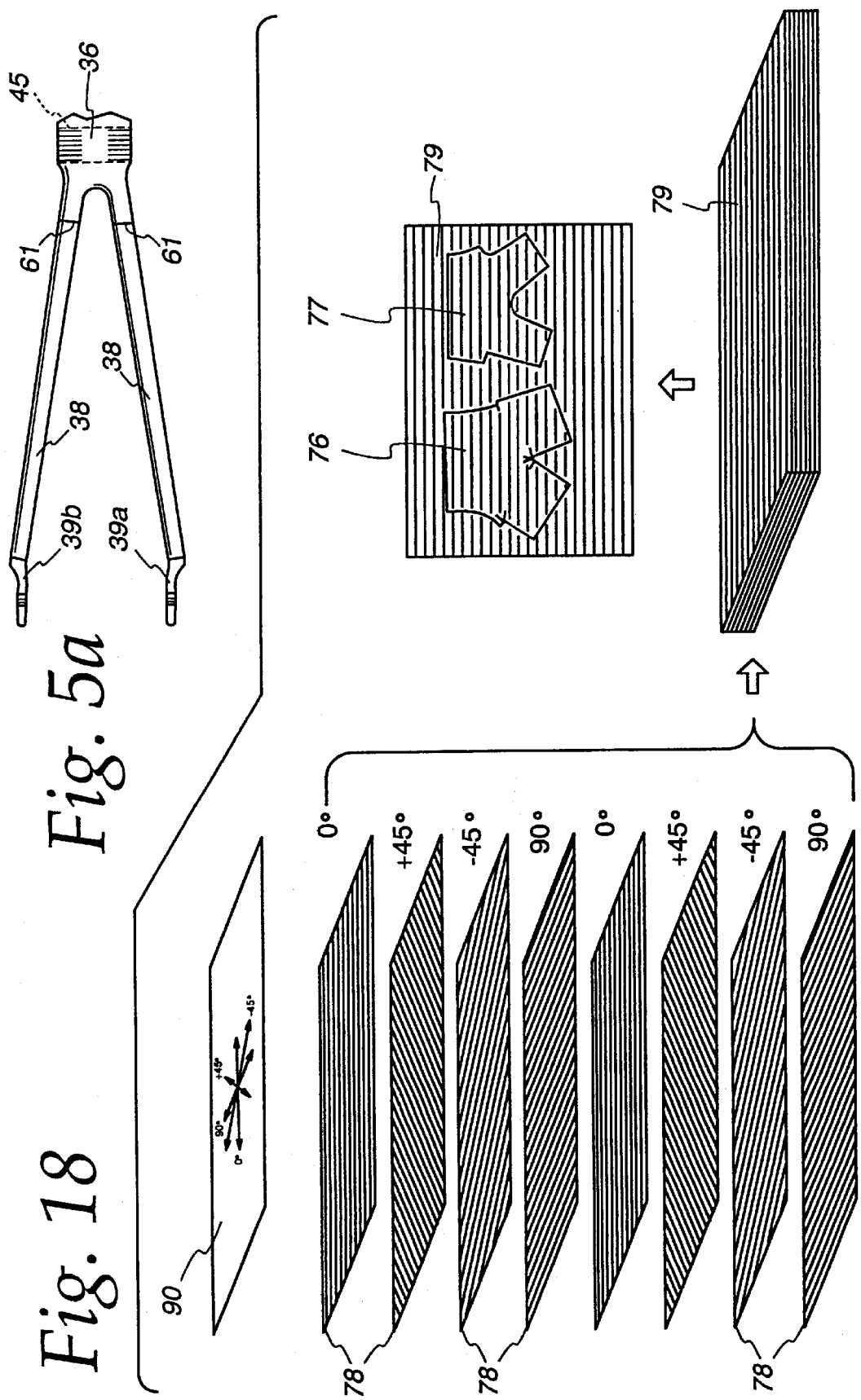

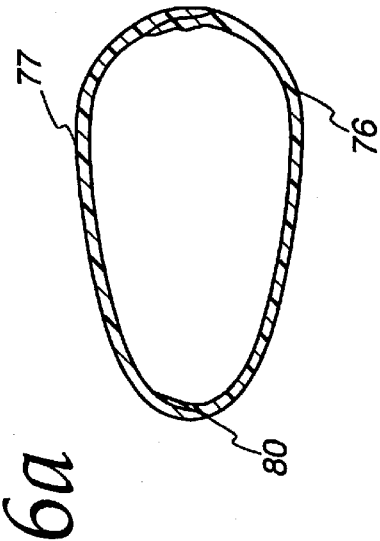
Fig. 6a
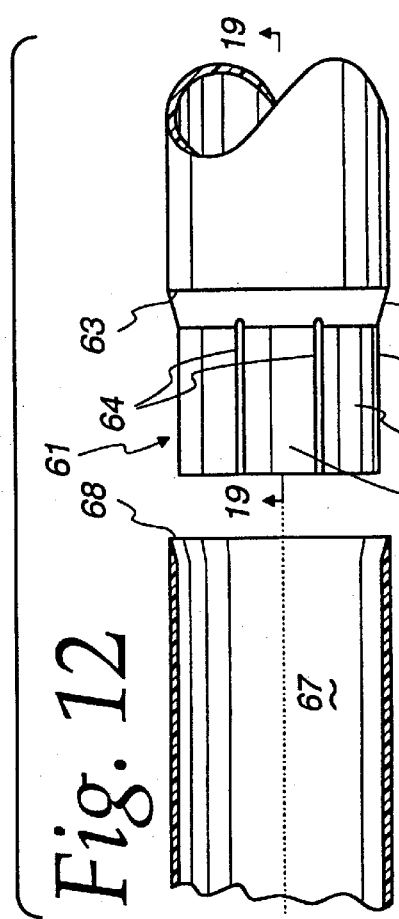
Fig. 12
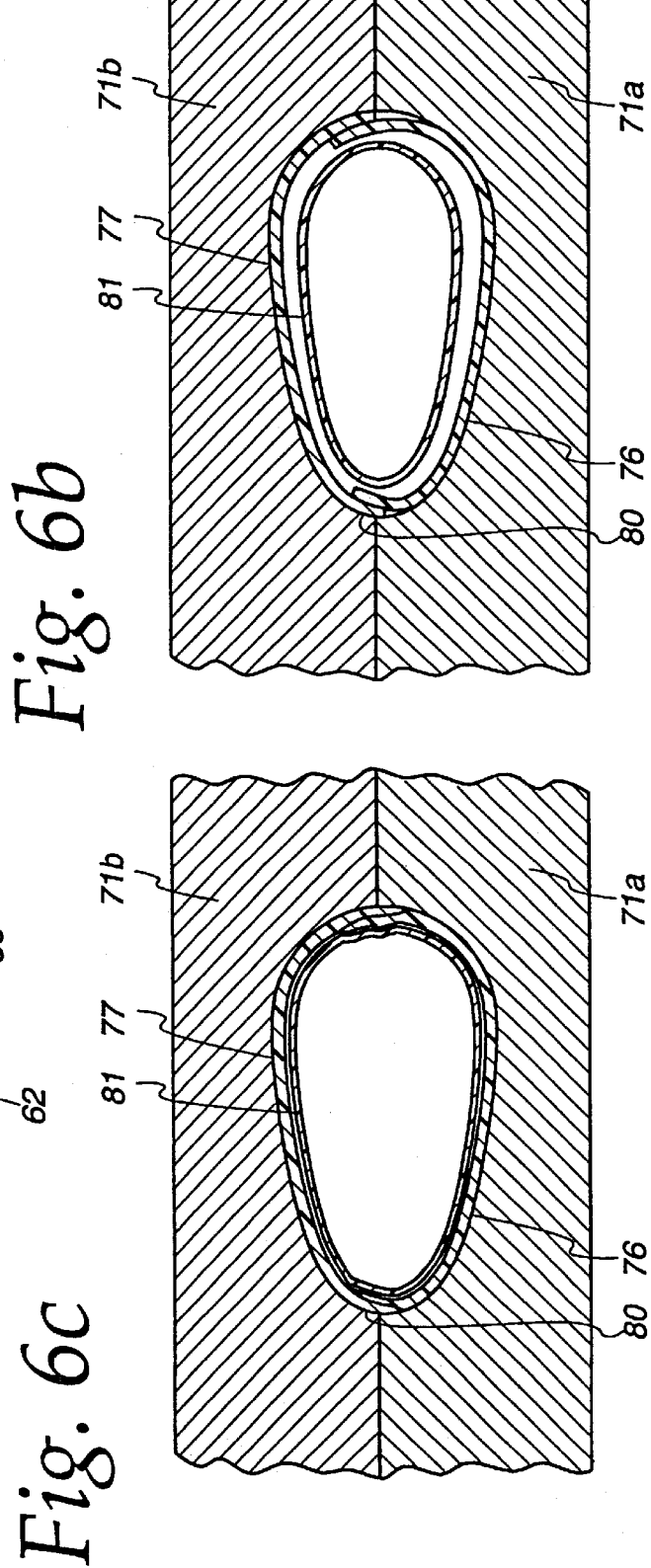
Fig. 6b
Fig. 6c

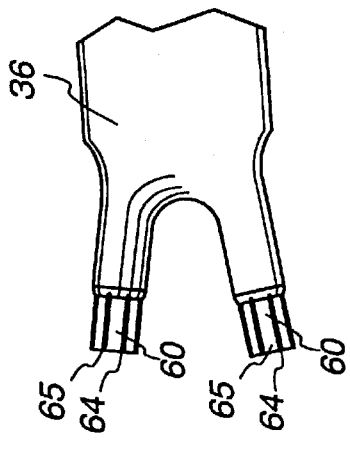
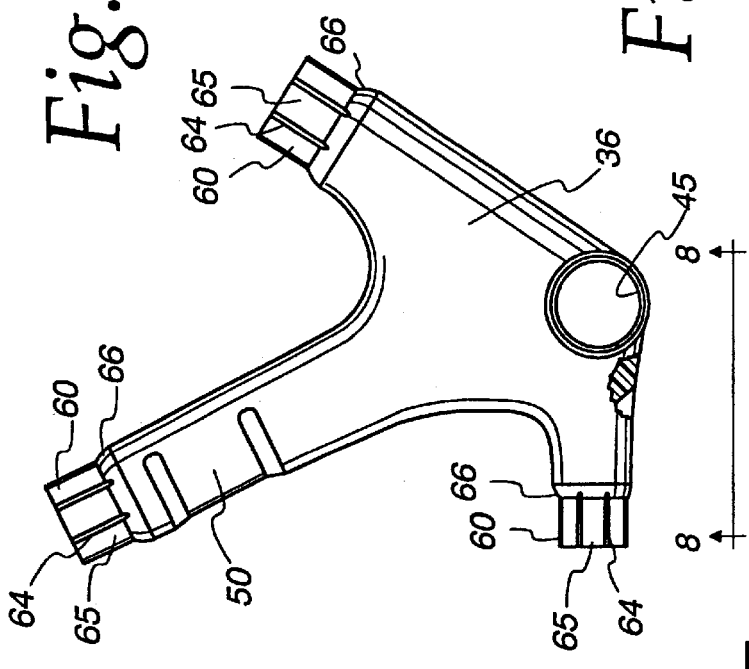
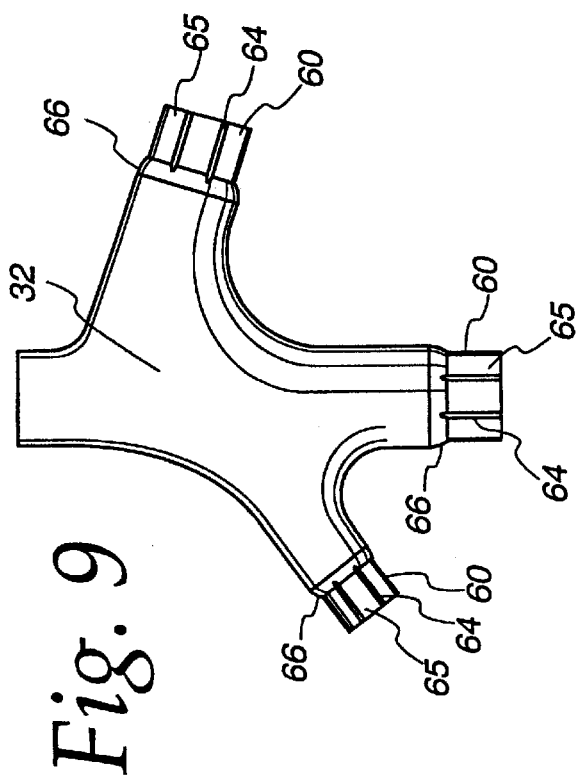
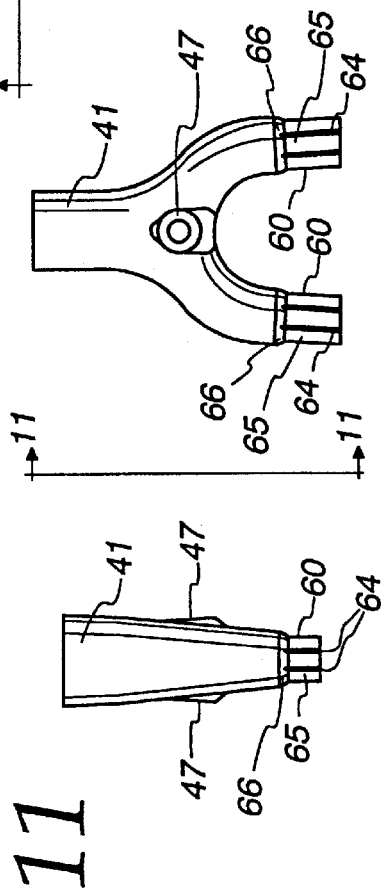

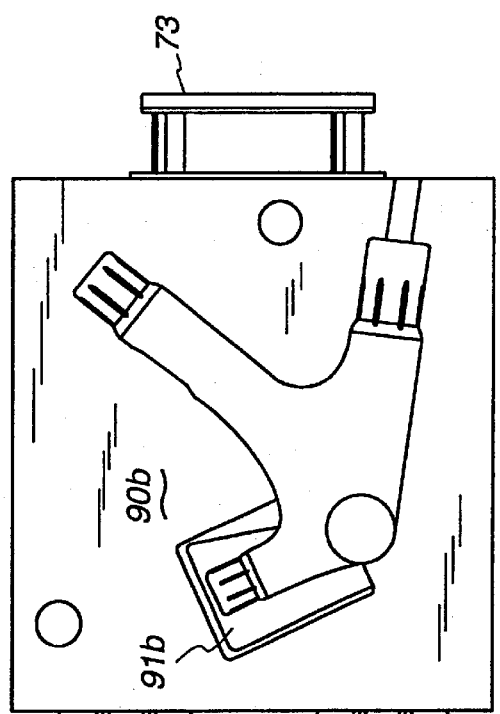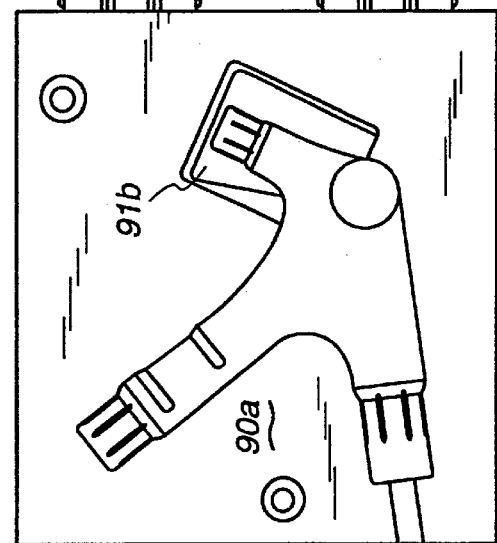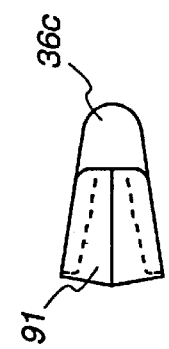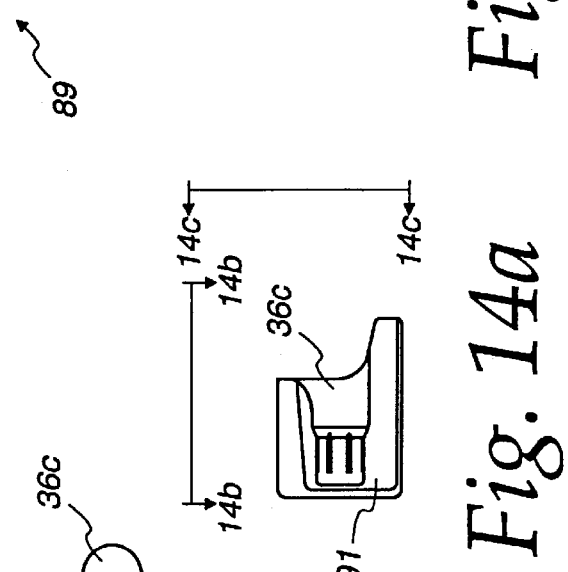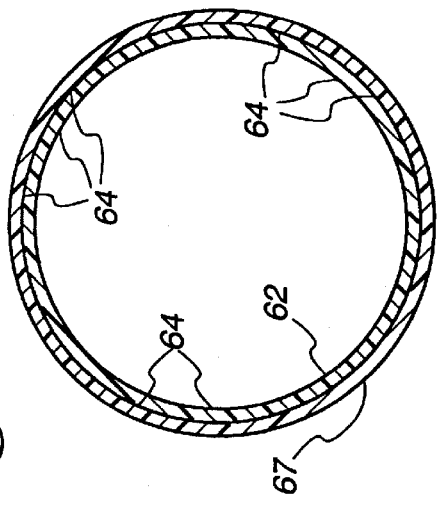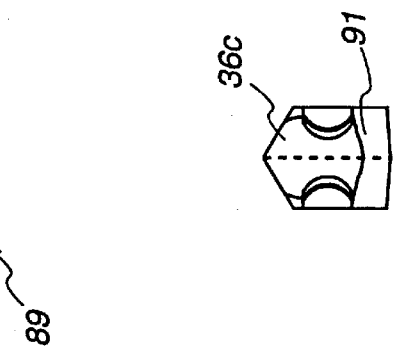

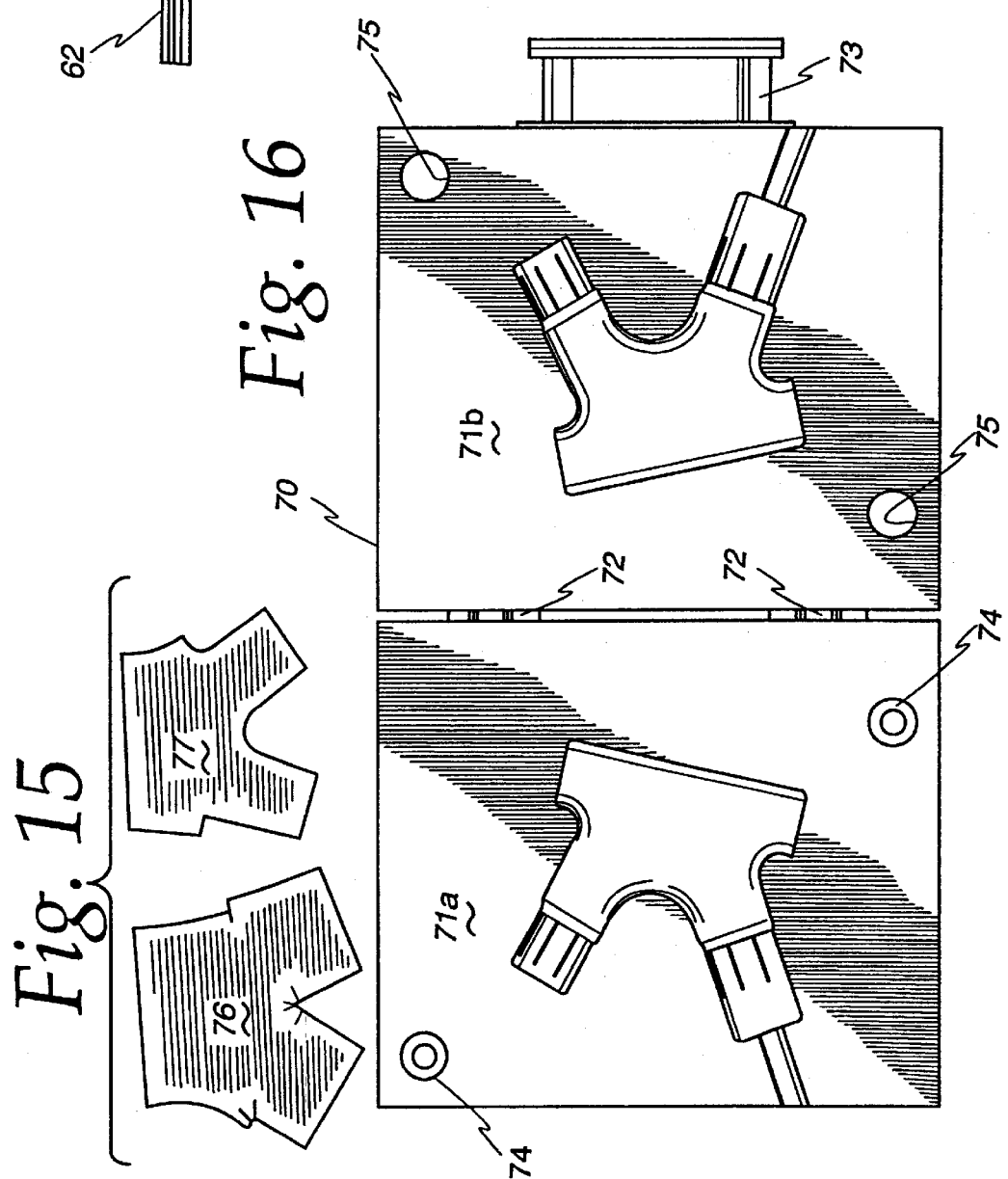

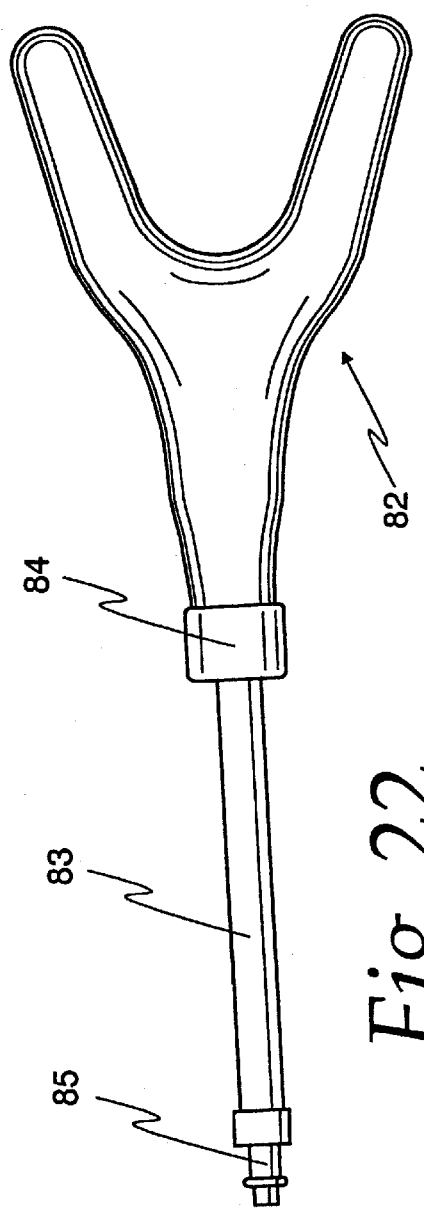
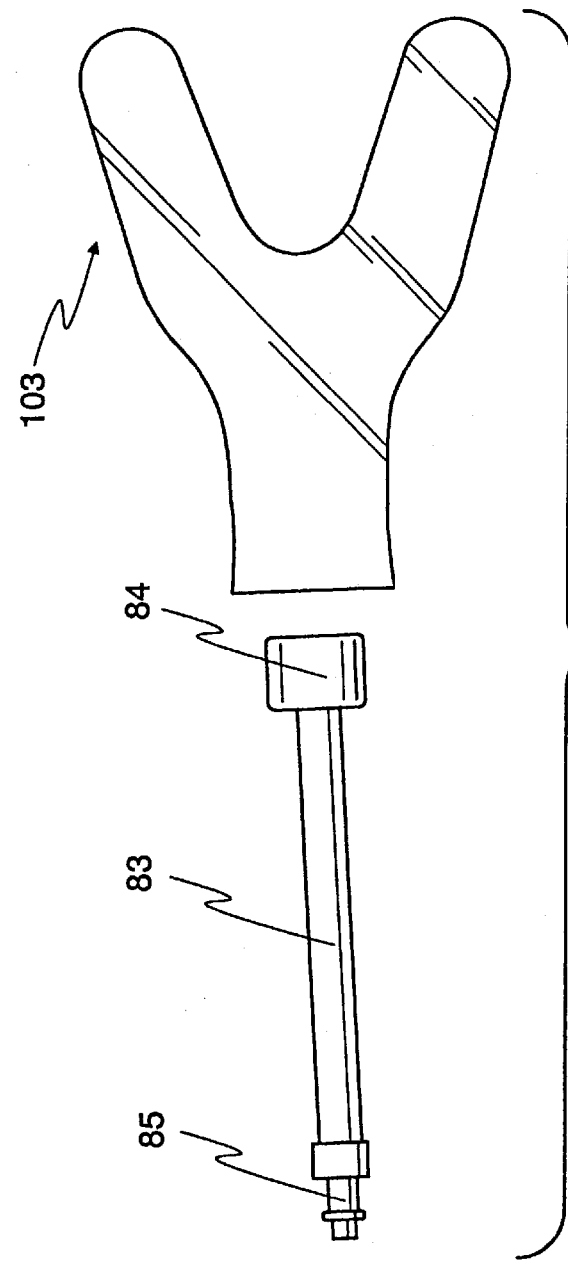

COMPOSITE BICYCLE FRAME AND METHODS FOR ITS CONSTRUCTION

This application is a divisional application from application Ser. No. 07/890,933 filed on May 29, 1992, now abandoned.

BACKGROUND OF THE INVENTION

1. Field of the Invention

This invention relates to bicycle frames and their method of manufacture and, more particularly, to a composite bicycle frame formed of composite components that are each separately formed by a method of the invention to have a thin wall with a high strength to weight ratio, and are designed to be easily fitted and secured together into a light, strong and stiff bicycle frame.

2. Background of the Invention

Until recently, bicycle frames have been constructed of metal tubes joined at their ends as by welding, or are brazed or soldered onto metal lugs, forming the frame. Recently, composite materials have been utilized in place of metal for frame construction. Such composite materials have a lower density, higher specific strength and stiffness, and better damping qualities than traditional metals, and thereby provide an increase in frame strength and stiffness with a reduction in weight, as compared to earlier metallic frames.

In construction of bicycle frames using such composite materials, the most common method for joining frame tubes, formed from such composite materials to each other, has consisted of adhesively joining the tubes to metal lugs or joint structures, thereby forming the bicycle frame. The disadvantage of using metallic lug components is their weight relative to composites, the weight of which metallic lug components significantly exceeds the weight of the frame composite tubes, thereby greatly limiting potential weight reductions. Also, the relatively high material density of metallic lug components has tended to favor a use of smaller diameter tubes and hence smaller lugs for weight savings, constituting a lesser strength frame with diminished damping qualities than would be provided utilizing larger tubes. The material density characteristics of metallic lugs has also prevented the development of structurally efficient large gussetted aerodynamic shapes for the lug components on account of the weight increase inherent with such shapes.

Where manufacture of one-piece all-composite unitary bicycle frames has been implemented, such manufacture has been found, for one thing, to be labor intensive. Further, the use of lower than optimum compaction pressures in actual practice has reduced material strength, and has required a greater use of materials than anticipated, resulting in a greater frame weight than predicted. Due to a frequency of structural strength problems and structurally related cosmetic problems occurring in service, such frames have been found to be generally unreliable.

3. Prior Art

Recently, a number of methods and procedures have been developed for producing all-composite bicycle frames. In one such method that provides for secondarily joining precured composite tubes to each other in a desired configuration, the tube ends are joined to each other utilizing uncured composite materials that are wrapped between the tube ends. The joints are then cured in place, forming a connection between the thus joined frame tubes to provide a composite frame. Such method is detailed in U.S. Pat. No. 5,019,312 to Bishop et al.; and U.S. Pat. No. 4,900,048 to Derujinsly. These patents teach similar processes for composite frame fabrication producing frames that are generally not hollow at the tube connections, in which processes the individual tube ends are trimmed or mitered in the joint forming process to fit closely together and receive uncured composite material wrapped therearound. Such uncured composite material as is used in frame construction is generally a reinforcing material that is laid over and between the frame tube members and is cured. To obtain an acceptable appearance for such joint, a significant amount of parasitic material is added to the joint surface for shaping that joint, which parasitic material is essentially an un-reinforced resin, containing fibers and a filler, to control its viscosity, and is for filling gaps and spaces as are present in the joint structure. These large gaps or spaces lie between the external surface on the gusset of the joint and the tubes which lie well inside the joint. Accordingly, the built up joints formed by a practice of such processes increases the weight of the resulting frames.

Additional problems with the above set out type of wrapped joint bicycle frame composite construction is that it is labor intensive at each stage of the manufacturing process, and it is not amenable to mass production techniques and, accordingly, this type of manufacturing process has not been successfully utilized for producing commercially affordable composite bicycle frames.

In a bicycle frame, it is well known to this art that stress loads are always the greatest at joints, and therefore, joint construction has always been a primary determinate influencing frame design and construction. To avoid inherent problems of material discontinuity at frame joints, a number of patents have been directed to reducing or eliminating the number of joints in a bicycle frame through a use of composite materials molded and cured together into a jointless frame. Some examples of this type of composite frame construction are shown in U.S. Pat. No. 3,375,024 to Bowden; U.S. Pat. No. 3,833,2343, to Thompson, Jr.; U.S. Pat. No. 4,015,854 to Ramond; U.S. Pat. No. 4,230,332, to Porsche, U.S. Pat. No. 4,493,749, to Brezina; U.S. Pat. No. 4,856,801, to Hollingsworth; and U.S. Pat. No. 4,986,949, to Brent J. Trimble, which Bowden, Ramond, Porsche, Hollingsworth and Brezina patents all show arrangements for reducing the number of joints in a bicycle frame, with the Hollingsworth patent showing a multi-layer composite unitary frame, and the Thompson, Jr. patent showing a solid cast unitary frame.

Trimble U.S. Pat. Nos. 4,986,949, 4,889,355, 4,902,458, 4,850,607, 4,923,203, 4,941,674 and Reissue U.S. Pat. No. 33,295, and a U.S. patent to Duplessis et al. U.S. Pat. No. 4,828,781, all show examples of jointless or unitary all-composite bicycle frames. These frames are generally hollow, so as to minimize weight as compared to metal or solid or nearly solid composite frames, as set out above.

Unitary composite bicycle frames have somewhat alleviated the problems of extra weight as has been associated with earlier frame joints since the joints are in essence eliminated. The manufacture of a jointless frame in a single step using high performance composite materials to eliminate steps in the manufacturing process, particularly the step where all the components are formed into a single frame. In practice, however, the manufacture of high quality, reliable one-piece, jointless frames has proven difficult and expensive, and accordingly, the number of one-piece jointless composite bicycle frames that have been sold is a small fraction of the number of metal lugged composite tubed frames sold. For example, one large impediment involves the difficulty of reliably producing uniform or high compaction pressures in the composite laminate during cure, due in part to the failure to develop reliable internal pressure bladders to operate satisfactorily throughout the frame. This results in lower structural performance and an outer surface finish which requires a large amount of manual labor to repair. This necessitates, therefore, in order to provide the required strength, that excess materials be used at the frame joints to avoid voids and flaws as could cause joint or frame failure. Such unitary composite frame construction is therefore labor intensive and results in a great deal of waste materials in both the manufacturing process itself and on account of rejections that fail to meet quality standards.

The present invention utilizes all composite hollow tubes and hollow lugs separately formed by the methods of the invention to have uniform thin walls for fitting and adhesive bonding together, whereby a composite bicycle frame is produced that has minimum weight for the required frame strength and stiffness. Problems with earlier frame construction prove that force concentrations at the joints are of major concern in frame design and fabrication. For meeting this problem, the present invention employs hollow frame tubes for fitting over male extensions or plugs extending from lugs their respective plugs of the invention, except that the lugs of the present invention are hollow and the respective mating surfaces of each hollow tube end and each lug male plug are tapered identically. The arrangement is such that the one tapered surface mates with a corresponding surface to produce a joint capable of transmitting high internal forces across the junction.

Insofar as terminology employed herein is concerned, while both the bicycle frame tubes and lugs made in accordance with the present invention are tubular, the frame component referred to hereinafter as a "tube" has reference to the frame elongate components, such as the familiar top tube, down tube, seat tube, and stay tubes that per se are well known to those experienced in the bicycle arts, while the term "lug" has reference to the hereinafter disclosed tubular structure that forms a particular flame joint with the respective "tubes" involved.

SUMMARY OF THE INVENTION

A principal object of the present invention is to provide an all-composite generally hollow bicycle frame, and processes for its manufacture, which frame is light in weight, stiff, and strong, and which has a construction that is amenable to mass construction.

Another principal object of the present invention is to provide a bicycle frame formed from interconnected all-composite hollow tubes and lugs that are individually and separately formed and cured by the processes of the invention to be thin walled, with the assembled all-composite frame to be exceptionally light, strong, and stiff.

It is another principal object of the present invention to provide a new method for the manufacture of a composite bicycle frame which is less costly and has a higher yield of good frames than current methods, and in which the new method results in a frame which is lighter, stiffer, stronger, more accurate dimensionally, with better surface finish, and with greater repairability than composite bicycle frames heretofore.

Another important object of the present invention is to provide all-composite tube and lug components that are individually formed prior to assembly to have complementary opposing surfaces for coupling, as by adhesive bonding, to form as assembled the hollow frame, which has joints having a smooth exterior and that provides a uniform and smooth force transmission thereacross.

Further objects of the invention are to provide methods of premaking and precuring such all composite lug and tube components.

Another object of the present invention is to provide all-composite tube and lug bicycle frame forming components that are thin walled, to minimize, as assembled, finished frame weight, and thereby form a bicycle frame of minimal weight, which components are individually strong and stiff and have strength and stiffness characteristics that, as assembled to form a bicycle frame, form a frame that is equal to or better than jointless all-composite, composite tube and metal lug, and even all metal bicycle frames.

Another object of the present invention is to provide an all-composite bicycle frame, where the component tubes and lugs thereof are precured composites that are secondarily bonded together to form the bicycle frame.

Still another object of the present invention is to provide lug components, for forming bicycle frames, that are produced in matched female tooling that conforms to the desired lug exterior shape and includes an internal pressurization device for supporting the composite mat during curing, that is then removable, leaving a thin walled hollow lug, with such lugs being provided for assembly with hollow composite tubes to form a bicycle frame.

Still another object of the present invention is to provide for use in assembling bicycle frames a composite lug having at least one male member or plug for receiving as part of the frame a thin walled composite tube with the lug male member or plug and the tube end having close fitting opposing surfaces for being tightly fitted together, thereby producing a high strength joint that is smooth and continuous on its exterior.

Still another object of the present invention is to provide a composite lug, for use in forming bicycle frames, formed of resin impregnated organic mats that, as a feature of the method of forming same, are arranged around a high pressure bladder positioned between closed female mold halves, providing for curing of such lug under uniformly applied high laminate compaction pressures, to produce a thin walled, low weight lug having a relatively smooth as-molded exterior surface finish.

Still another object of the present invention is to provide an all-composite, hollow, bicycle frame that is an assemblage of uniform thin walled tubes and lugs manufactured by the process of the invention and that are joined to form a bicycle frame that is stiff, light in weight, and has high strength tube-lug joints.

The bicycle frame of the present invention is an all-composite frame formed by connecting hollow composite tubes onto male members or plugs of hollow composite lugs, to form a light weight, high strength, stiff, bicycle frame. The composite tubes and lugs of the invention are formed to have uniform thin walls, without voids, and provide for uniform stress transmission therethrough, with the tubes and lugs being first individually formed and cured, and that are then bonded in assembled relation to form a composite bicycle frame.

To provide for a uniform surface to surface engagement of each tube and lug connection where a uniform stress transmission across the joint is to be achieved, the hollow tube is formed with an inward taper at its end for engaging a sloping step that is formed around the lug male member or plug at the tube limit of travel thereover, with the tube angle of end taper and the angle of the opposing face of the sloping lug step are mirror images to provide a close fitting engagement; such opposing taper and step face surfaces are preferably complementary angles in the range of from about six (6) to about seventeen (17) degrees, to optimize the force transmission properties of the joint and strength of the lug at the joint. Radially spaced ribs or splines are formed along the lug male member or plug end, from the step face to the lug male member or plug end, leaving shallow depressions therebetween that are to receive an adhesive coating for bonding to the tube interior, with the adhesive joint providing for joined tubes and lugs and an affixing of these components together into nearly a seamless junction. The spacing distance between a joined tube cylindrical inner wall and a lug male member or plug shallow depressions is closely controlled to provide a thick but uniform adhesive thickness, producing thereby a reliable high strength frame joint.

The tube and joint design and lug manufacture of the present invention provide a high strength tube to lug joint that does not require additional reinforcement, as was the case with prior art composite frames, with such joint being essentially a seamless one on its exterior, facilitating preparation for applying a smooth aerodynamic exterior finish to the frame.

To provide individual tube and lug components in accordance with the present invention that are of uniform thin wall construction, the present invention also involves a method of applying high laminate compaction pressure to the frame lug component during the manufacture of the latter. The fabricating of such high strength thin wall lug components involves arranging resin impregnated mats or layers to overlap around a pressure bladder, between opposing female molds that are closed and the lug cured therein. The pressure bladder is designed to provide a reliable and uniform application of high pressure throughout the interior of the lug part or component during cure, with such bladders conforming to and essentially filling the individual lug component interior and being either disposable (to remain in the lug component) or being reusable, to be collapsed and removed from the lug component. In practice, pressures equal to or greater two hundred (200) psi are applied by bladder pressurization during lug component curing, in accordance with the present invention. This high pressure produces an exceptionally high ratio of fibers to resin, and a very low ratio of void volume to total laminate volume. Both of these characteristics produce a laminate which is much stronger than laminates produced with lower pressure processes.

A uniform wall thickness for each lug component is achieved by a practice of the invention that, along with the particular coupling configuration of the lug male member or plug and tube end, provides a bicycle frame that will meet anticipated stresses without a need for reinforcement in the joint areas of the frame. Thus, no frame reinforcement is required at the frame joints or adjacent them, in accordance with the present invention. Accordingly, a bicycle frame that is appropriate for meeting design stresses can be provided by the lug and tube design of the present invention. Such frame will have a minimum cross-section and wall thickness for anticipated stresses, and will utilize minimal materials in its construction, with the resulting frame having a minimum weight and high strength.

The present invention provides an all-composite bicycle frame that is less expensive to construct in that minimum amounts of materials are used in component fabrication, with fewer finished parts rejected, and, requires a minimum finishing time to trim and paint the frame. Further, the flexibility of the manufacturing process of the present invention allows a number of different frame sizes to be economically manufactured from the same pre-made and cured components to provide a particular frame to better fit an individual bicycle rider.

Other objects, uses, and advantages will be obvious or become apparent from a consideration of the following detailed description and the application drawings in which like reference numerals indicate like parts throughout the several views.

THE DRAWINGS

FIG. 5 is a side elevation view like that of FIG. 1 showing the frame embodiment of FIG. 1 and illustrating the frame interior features in broken lines;

FIG. 5A is a bottom plan view, in the direction of arrows 5A of FIG. 5;

FIG. 6 is a side elevation of the head lug component shown removed from the frame of FIGS. 1 and 5;

FIG. 6A is a cross sectional view of the frame head lug component taken along the line 6A—6A of FIG. 6;

FIG. 6B is a cross sectional view of the frame head lug component during the making of the frame lug component involved in accordance with the present invention, this Figure being a cross sectional view of opposing female mold halves wherein are contained resin impregnated mats that overlap at their edges and are wrapped around an internal pressure bladder for forming the head lug of FIG. 6;

FIG. 6C is a cross sectional view of the opposing female mold halves of FIG. 6B showing the internal pressure bladder involved inflated to urge the resin impregnated matting referred to into the contours of the interior surfaces of the mold halves;

FIG. 7 is a side elevation view of the bottom bracket lug shown removed from the frame of FIG. 1;

FIG. 8 is a bottom plan view of a portion of the bottom bracket lug and is taken along line 8—8 of FIG. 7;

FIG. 9 is a side elevation view of the seat lug shown removed from the frame of FIG. 1;

FIG. 10 is a rear elevation view of the monostay yoke lug, shown separated from the frame of FIGS. 1 and 5;

FIG. 11 is a side elevation view of the monostay yoke lug of FIG. 10 and is taken along line 11—11 of FIG. 10;

FIG. 12 is a side elevation view of a portion of the frame seat lug and a portion of the frame top tube, as shown in FIG. 5, shown broken apart;

FIG. 13 is a cross sectional view of the cylindrical male member or plug of the seat lug and the top tube taken along the line 13—13 of FIG. 5;

FIG. 14 is a top plan view of two female mold halves of the mold tooling, that is used in the curing of the frame bottom bracket lug of FIG. 7 in accordance with the present invention;

Figure 1:
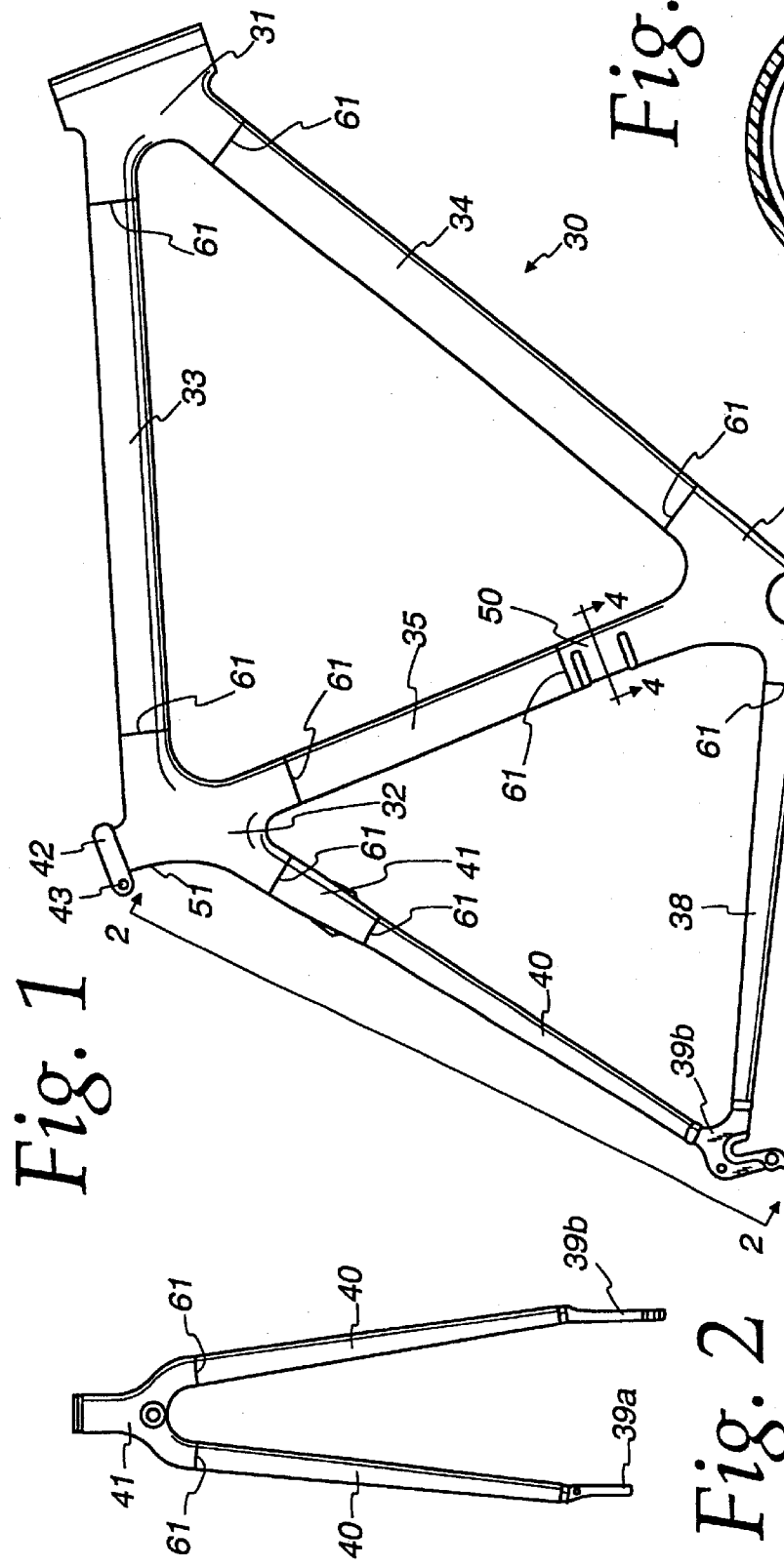
FIG. 1 is a side elevation view of a preferred embodiment of an all-composite bicycle frame arranged in accordance with the invention.
Figure 17:
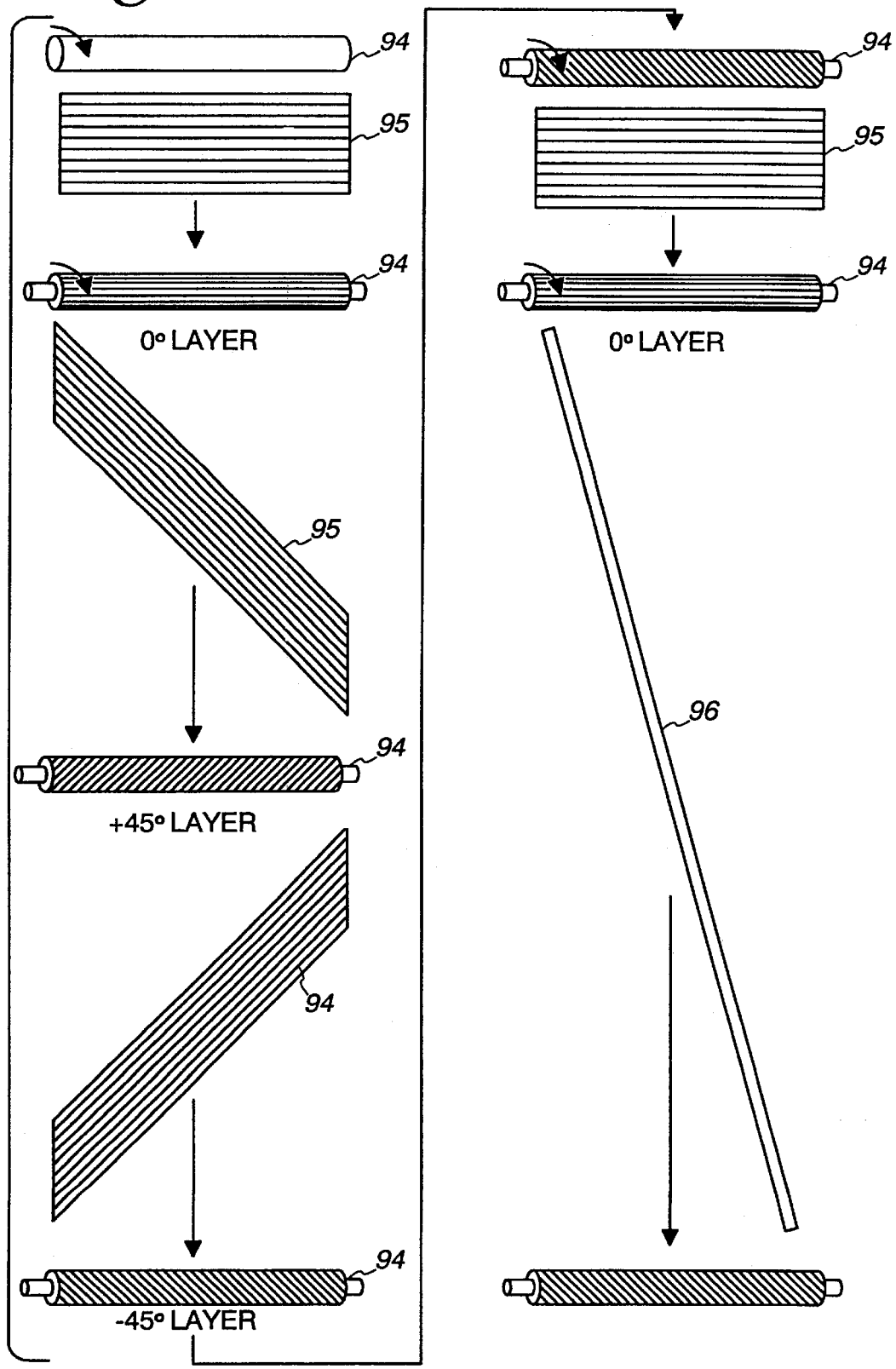

FIGS. 14A, 14B, and 14C are a three view representation of a third mold piece as is used in the fabrication of the frame bottom bracket lug of FIG. 12, as shown in FIG. 14;

FIG. 15 is a top plan view of two preimpregnated composite preforms or mats that are proportioned for arrangement in the opposing female mold halves of FIGS. 6B, 6C and 16 for fabrication, with precuring, of the head lug of FIG. 6 in accordance with the invention;

FIG. 16 is a top plan view of two female mold halves of the mold tooling used for fabricating and precuring of the frame head lug of FIG. 6;

FIG. 17 is a flow schematic illustrating a process of the present invention for pre-forming the cylindrical tubes of the frame of FIG. 1;

FIG. 18 is a flow schematic illustrating a process that is utilized to construct uncured composite preforms or mats (which, for example, are trimmed to the shapes shown in FIG. 15 in the case of the frame head lug) that are subsequently molded and precured as disclosed herein to produce the lug components of the frame of the invention (see, for instance, FIG. 1);

FIG. 19 is a fragmental, longitudinal sectional view of a male member or plug of the frame seat lug that is aligned for insertion into a seat tube in accordance with the invention, taken along the line 19—19 of FIG. 12;

FIG. 20 is an enlarged sectional view of the conical portion of the lug of FIG. 19, in the lug area indicated by reference numeral 20 (of FIG. 19), showing the exterior annular step that is part of each lug, in accordance with the present invention, to form a frame joint;

FIG. 21 is a top plan view of a heat sealed thermoplastic film bladder and bladder sprue used during fabrication of the monostay yoke lug component, with the bladder being shown after heat sealing and prior to attachment to the bladder sprue; and FIG. 22 is a top plan view of a formed rubber internal pressure bladder and bladder sprue used in the fabrication of the monostay yoke lug component shown in FIGS. 10 and 11.

To provide assistance in finding specific drawing figures, the following grouping is appropriate:

| Figure No. | Drawing Sheet |
|---|---|
| 5A | 8 |
| 6A–6B | 3 |
| 12 | 3 |
| 15 and 16 | 6 |
| 17 | 7 |
| 18 | 8 |
| 19 | 6 |
| 20 | 6 |

However, it is to be distinctly understood that the drawing illustrations referred to are provided primarily to comply with the disclosure requirements of the Patent Laws, and that the invention is susceptible of modifications and variations that will be obvious to those skilled in the art, and that are intended to be covered by the appended claims.

GENERAL DESCRIPTION

The invention is concerned with a bicycle frame formed by joining composite tubes and lugs, and thus is concerned with an all-composite bicycle frame. Unique to the invention is that the frame is formed of thin walled hollow precured lug and tube components that are end bonded to form the complete bicycle frame. The frame lugs are located at the intersections of the frame tubes and serve as connecting members between the various frame tubes. The tube and lug components of each frame are configured to provide a strong frame joint that, without reinforcement, will uniformly transmit applied forces between the frame tubes and lugs. The frame lugs and tubes of the present invention are pre-formed and precured, in accordance with the present invention by overlapping mats or layers of resin impregnated organic fibrous materials (known in this art as composite materials) positioned around an internal pressure bladder for arrangement between mold tooling female mold members (that are to oppose each other), with the lugs, after finishing (to form each frame), receiving an adhesive that is applied to the lug male member or plug surface, with an end of an adjacent composite tube, to which the same adhesive is also applied, fitted thereover to form the frame.

The individual composite lug components of the invention serve as primary load carrying structural members between such tubes. Also, as the frame of the invention is preferably assembled from a number of pre-formed and precured lug and tube component parts, this allows for component interchangeability where different sized of frames can utilize the same components.

Figure 4:
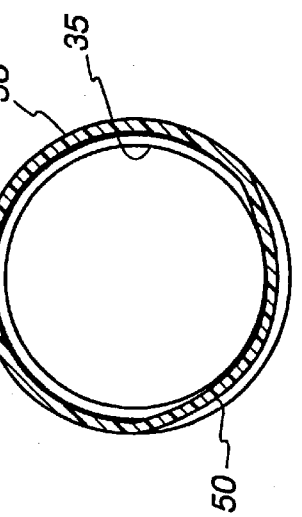
FIG. 4 is a cross sectional view of the seat tube portion of the frame bottom bracket lug, taken along the line 4—4 of FIG. 1.
Figure 3:
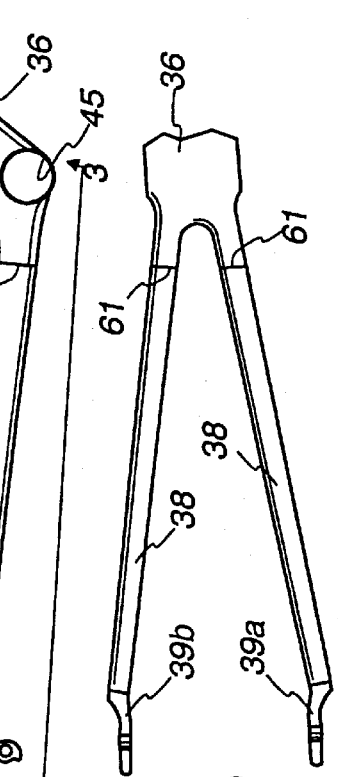
FIG. 3 is a bottom plan view of the frame taken along the line 3—3 of FIG. 1.
Figure 2:
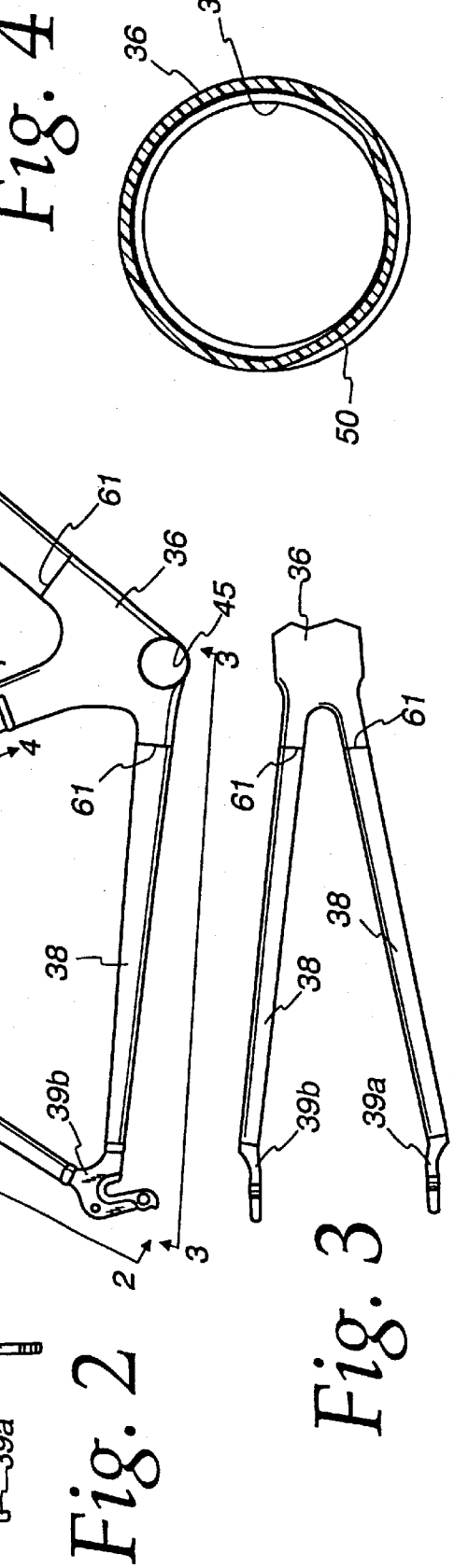
FIG. 2 is a rear end view of the frame taken along the line 2—2 of FIG. 1.

A bicycle frame 30 arranged and made in accordance with invention is shown in FIG. 1, with sections thereof shown in FIGS. 2 through 4; frame 30 is an example only of an application of the invention to bicycle frames. It will, of course, be obvious that other configurations of bicycle frames can be arranged and made as set out herein, and that even other types of bicycle frames may be arranged and manufactured as set out herein, all within the scope of this disclosure.

FIGS. 1, 2, and 3 depict exterior views of a preferred embodiment 30. In general, bicycle frame 30 will perform several primary functions, to include: providing a support for the bicycle wheels; providing a bar arrangement for steering the bicycle; providing a support for a pedal mechanism that provides a source of motive power; providing a support for a seat; and providing a support or supports for a braking mechanism, not shown. The bicycle frame 30, as described, is a frame for a traditional two wheeled bicycle, and defines a traditional diamond frame construction that is diagrammatically illustrated, although a wide range of frame geometry configurations may be employed in accordance with our invention, which is concerned with the frame 30 being essentially of the composite type, it being formed by the hereinafter described composite lug and composite tube components, made, shaped, and joined together, in accordance with our invention.

The frame 30, as shown, includes a head lug 31 and a seat lug 32, with top tube 33 extending therebetween. The head lug 31 connects also to a down tube 34 that is fitted to a bottom bracket lug 36. A seat tube 35 connects between a seat lug 32 and the bottom bracket lug 36. The bottom bracket lug 36 forks, as shown in FIG. 3, to mount, respectively, a pair of chain stay tubes 38. The chain stay tubes 38 are respectively telescoped over plugs or male members of rear dropouts 39a and 39b that also couple to seat stays 40, as best shown in FIG. 2; the opposite ends of the respective seat stays 40 telescope onto plugs or male members of a monostay yoke lug 41 that in the frame 30 is a rear most section of the seat lug component 32.

In accordance with the present invention, the respective lug and tube components referred to are precured formed, in advance, from composite materials, that is, non-metallic heat curable synthetic resins reinforced with structural fibers. More specifically, the composite material used in the formation of the referred to lugs and tubes, in accordance with the invention, comprises a plurality of organic fiber layers each forming a mat or sheet, in which the fibers composing each layer are preferably oriented at different angles from those of the layers immediately above and below same, so as to cross over each other; further, all of such layers are impregnated with a resin that will harden to form, as herein disclosed, the finished component.

In the preferred embodiment, the resin is preimpregnated into the fiber mats or beds prior to the hereinafter disclosed forming of the referred to lugs and tubes; hence the term that is commonly used for this material is "prepreg" composite. A prepreg composite is commonly available in standard form with a variety of different resins and reinforcing fibers from several different manufacturers. It is, however, not required to use the prepreg form of the composite material to practice this invention. For example, it is possible to manually add the resin to dry fiber material which has been correctly positioned in tooling of the type hereinafter disclosed before such tooling is closed, and prior to curing of such material. Also, resin of the type indicated can be injected into a closed mold (forming such tooling) in which a dry fiber mat or bed has been placed, in accordance with the present invention.

As to the lug components involved, they, in their precured form, are generally hollow, with structural loads applied to the frame (of which they become a part, in accordance with the present invention), to be carried through the external shell defined by the resulting frame.

The internal construction of the frame 30 with primary structural members is indicated in FIGS. 5 and 5A, which frame 30, it should be understood, is arranged for connection to standard bicycle component assemblies, as set out above. Thus, the head lug 31 supports a conventional front fork assembly, not shown, which mounts a conventional handlebar and a conventional front wheel. The front fork assembly (not shown) is to provide a means for steering the bicycle and supports the front wheel (also not shown). The head lug 31 is shown best in FIG. 6. The seat lug 32 supports a seat post (not shown) that mounts a seat (not shown). The seat post is maintained in the seat lug by appropriately tightening a connector 43 of a seat clamp 42. A detailed view of the seat lug 32 is shown best in FIG. 9. The bottom bracket lug 36 supports an axle (not shown) that connects to cranks (not shown) that, in turn, connect to pedals (not shown). A detailed view of the bottom bracket lug 36 is shown in FIGS. 7 and 8. The monostay yoke lug 41 supports a rear brake assembly (not shown), and is connected directly to the aft portion of seat lug 32. The monostay yoke lug 41 provides the support for the rear wheel and rear wheel brake assembly (both not shown). A detailed view of the monostay yoke lug 41 is shown in FIGS. 10 and 11, which monostay yoke lug 41 could be incorporated into or later joined to the seat lug 32, within the scope of this disclosure, and the rear brake assembly could be located elsewhere on the aft portion of the frame. While the present disclosure shows a separate monostay yoke lug 41, this arrangement is primarily to simplify manufacture and reduce manufacturing costs of the frame 30, though it should be understood the monostay yoke lug 41 could be constructed as part of the seat lug 32. The monostay yoke lug 41 will accommodate inclusion with a number of sizes of frames, thereby allowing for a wider range of frame sizes to be manufactured utilizing the same components, thereby reducing the total count of parts needed to manufacture a range of frames 30.

The frame top tube 33 is shown in FIGS. 1 and S to be approximately horizontal in frame 30 and extends between the frame head lug 31 and the seat lug 32. The frame down tube 34 connects at its ends to the head lug 31 and the bottom bracket lug 36, respectively. The frame seat tube 35 in turn connects at its respective ends to the seat lug 32 and the bottom bracket lug 36. These three tubes, the top tube 33, the down tube 34, and the seat tube 35, are the "three main tubes" of frame 30, which three main tubes 33, 34 and 35 are each straight and preferably have a circular cross section, although it should be understood they could be of a non-circular cross section and be curved, as desired. A use of a straight composite tube having a circular cross section for each of the "three main tubes" allows a relatively low cost manufacturing process to be employed for the fabrication of these three tubes, as set out below. Composite tubes of non-circular cross section and/or curved tubes can be provided using a process similar to that used for the lug components, as described below, in accordance with the present invention.

The seat stays 40 of frame 30 are a pair of composite tubes that extend upwardly from each side of conventional rear drop outs 39A and 39B that mount the rear wheel, near the rear axle, with rear drop out 39B shown in FIG. 2 as being slightly longer for mounting a rear derailleur; seat stays 40 are proportioned to extend towards the seat lug 32 and connect one each side of the monostay yoke lug 41. The seat stays 40 are straight and of circular cross section in the preferred embodiment of this invention, although they could be of a non-circular cross section and be curved, as desired.

Similar to the seat stays 40, the frame chain stays 38 are a pair of composite tubes which extend forward from the respective rear dropouts 39A and 39B, on each side of the space in which the rear wheel is to be positioned, and connect to each side of the bottom bracket lug 36. The chain stays 38, in the frame 30, have an elliptical cross section and taper from a large forward end to a smaller circular cross section at the small end that connects over male members or plugs of the rear dropouts 39A and 39B, though of course the chain stays 38 can be of any non-circular cross section or may be curved, as desired. The rear dropouts 39A and 39B, as set out above, interconnect the chain stays 38 and seat stays 40, and support the bicycle rear axle (not shown). The rear dropouts 39A and 39B are preferably metallic, although they could be formed of composite materials, within the scope of this disclosure. Metallic dropouts, however, will resist galling from repeated removal and attachment of the rear wheel.

Each of the lug components of the invention is generally hollow and free of metallic inserts, except for metallic sleeves as may be needed for the attachment of external hardware, and even then such sleeves are not relied on for frame strengthening or reinforcement. Examples of such frame interior sleeves are shown in FIGS. 5 and 5A, and discussed below. Shown in FIG. 5, the frame head lug 31 contains an inner sleeve 44 that serves to support the front fork assembly (not shown). The frame bottom bracket lug 36 is shown to contain an inner sleeve 45 that extends thereacross and serves to support the pedal-crank axle (not shown). The frame seat lug 32 is shown to contain a sleeve 46 which serves to support the seat post, not shown. The frame monostay yoke lug 41 is shown as containing a sleeve 47, shown in FIG. 5, that is actually composed of two separate sleeves with small flanges on the ends thereof, which are inserted on each side of the monostay yoke 41, and which serves to support the rear brake assembly (not shown). The sleeves 44, 45, 46 and 47 are suitable for use with both composite material and metal constructions, which seat lug sleeve 46 is preferably a composite, while the other sleeves 44, 45 and 47 are preferably metallic. The sleeves 44, 45, 46 and 47 are generally bonded to a lug after the lug has been joined to its tubes by means of a secondary adhesive, although such sleeves can be individually bonded to the inside of the lug during the forming of that lug. In general, a sleeve of the type referred to may not be required to extend completely through a lug, as shown for instance with regard to sleeve 44, but instead can be a pair of relatively short or thin cylindrical rings that are located at opposite sides or ends of the particular lug opening, or the sleeves may, depending on the lug construction, be omitted as where an appropriate cavity is formed in the lug in its manufacture. Accordingly, such sleeves can, for some applications, be omitted and compensated for by a local application of a slightly thicker shell thickness.

As to the sleeve 45, it is shown installed in and across the bottom bracket lug 36 (see FIG. 5) and it is preferably metallic to provide a durable threaded interior that is capable of repeated removal and reinsertion of the bottom bracket axle assembly (not shown) as required, for maintenance or repair of the axle assembly. While composite material can be threaded directly, such threads would be less durable, but for some applications, may be acceptable.

The bottom bracket lug 36, shown on an enlarged scale in FIG. 7, also contains a recessed and internally reinforced dimple area 50, for attachment of a front derailleur (not shown). The recessed dimple 50 is reinforced internally and can consist of a metallic insert, either cured or secondarily bonded, or can be formed by curing of additional composite material thereat. Within the scope of this invention, other arrangements can be employed for attaching the front derailleur.

The head lug sleeve 44, like the bottom bracket sleeve 45, is preferably metallic to allow for repeated removal and insertion of bearing races that may be press fitted into the head lug 44 to support the front fork assembly (not shown).

The monostay yoke lug sleeve 47 is preferably metallic to resist galling during adjustment of a rear brake assembly (not shown).

The seat lug sleeve 46 is preferably formed from a suitable composite material rather than being formed from metal since there are not anticipated localized high loads or threads thereon as may be subject to damage. Shown best in FIGS. 1 and 5, the seat clamp 42 is of the familiar "C" shape to slip over a seat post (not shown) at the top of seat lug 32 and contains a small bolt and nut device 43, which device 43 is conventionally tightened to provide clamping on the seat post (not shown) that is to be received in the seat lug sleeve 46, at a desired height above the seat clamp 42. A short longitudinal slot is preferably machined at the top of the seat lug 32 on its aft side (where indicated at 51 in FIG. 5), and a similar short longitudinal slot is preferably machined at the top of seat lug 32 on its foreside (where indicated at 52 and FIG. 5). The slots indicated at 51 and 52 are to allow the clamp 42 to flex the adjacent annulus of lug 32 and sleeve 46 tightly around the seat post (not shown). The seat clamp 42 resists a concentration of thrust loads applied along the direction of the seat post centerline, and prevents rotation of the seat post about its centerline. The seat lug sleeve 46 serves the function of providing an annular surface which fully contacts the to be inserted portion of the seat post (the support involved also resists an application of lateral loads and twisting moments). The seat post sleeve 46 can be omitted or replaced with another arrangement as will perform the same function. For example, if a long seat post (not shown) is used that extends within the seat lug 32 to near the bottom thereof, then the seat post sleeve 46 can be omitted.

The lug components 31, 32, 36 and 41 of frame 30 each include one or more joint forming, tubular, male members or plugs 60, hereinafter referred to as a plug or plugs, that are to individually fit inside a frame tube end to form a tube-lug component joint 61 (see for instance FIG. 12). FIG. 19 is a cross sectional view of a typical joint plug 60 the nature of joint 61 will be described in greater detail hereinbelow. Formation of the frame tubes (as such) is also hereinafter discussed.

Shown best in FIGS. 19 and 20 (but see also FIG. 12), in the preferred embodiment of the invention, the plug 60 is shown to include a small discrete annular external step or stop 63 that is formed around the base 65 of the plug body 62. While the small discrete step or stop 63 is not essential to the function of the frame 30, it serves several useful purposes in the assembly of the frame 30. Specifically, the vertical step or stop 63 provides a positive stop for location of a tube end with respect to a specific lug component plug 60, and insures that such lug plug centerline will be parallel to a mating tube 67 centerline (see FIG. 12). This configuration of these parts controls the thickness of a layer of adhesive that is to be coated between spaced ribs or splines 64 that extend along the plug body 62 that project from the tapered conical section 66 of each lug. The adhesive is applied to the area on the plug base 65 and the tapered conical area 69. The tapered conical area 66 of the resulting joint 61 reduces the peak stresses in the joint adhesive at the base of the plug 60 by reducing the severity of the structural discontinuity. Further, the discrete vertical step 63 of a plug 60 also simplifies fabrication and finishing of a tube that is to be applied to the plug 60 involved prior to bonding of the indicated tubes and lugs to form the frame 30, when a lug vertical step 63 is to contact a corresponding step or end edge 68 formed on the end of the mating tube 67 (see FIG. 12), when such tube is fitted onto the lug in question (which step 68 is easily formed, as it involves only trimming the tube end to a blunt end rather than a sharp edge); the vertical step 63 and step or edge 68 engagement therewith also covers any small gaps or crevices as may exist between the tube end and the lug, providing thereby a clean joint 61 and simplifying finishing and painting of the final frame 30 to a continuous sealed outer surface.

The small discrete annular step 63 located the base of the indicated plug body 62 is followed by the plug tapered conical section 66, that is short and intersects the plug cylindrical body 62, that extends to the end of indicated plug 60. The indicated plug tapered conical section 66 performs two very important structural functions in forming a joint 61. First, as noted above, it provides for a reduction of peak stresses in the adhesive at the plug base 63. The tapered portion of the mating tube 67 allows for a more gradual and smoother transfer of load from the lug to the tube. This also reduces localized bending of the lug and tube walls which reduces peak stresses. Secondly, the indicated plug having the tapered conical section 66 provides an arrangement for keeping the longitudinal fiber layers 101 (see FIG. 20) of the lug involved from becoming disposed at a sharp angle 102 (see FIG. 20) to the tube-plug centerline. This function is essential in reducing radial axial shear stresses that in the completed frame 30, may exist at joint 61, to an acceptable level, thereby preventing localized failure at the indicated plug base and mating tube end junctions.

In general, the angle that the herein disclosed plug tapered conical section 66 makes with a mating tube 67 centerline must be less than thirty (30) degrees to produce reasonably lightweight lugs and is preferably an angle selected from a range of angles from about six (6) to about seventeen (17)

degrees. A utilization of lower angles than thirty (30) degrees will result in lower stresses at a frame joint 61, and a lesser angle of the indicated range of angles of approximately ten (10) degrees is preferred for use in the invention. This angle allows the lug to be formed without a necessity for any additional reinforcement being added in the lug plug 60 and in the end of its mating tube 67.

The preferred embodiment of this invention also includes an inclusion of a number of small longitudinal ribs or splines 64 spaced around the cylindrical body portion 62 of the plug 60. These splines or ribs 64 are nominally approximately the height of the adhesive thickness that is applied in the gaps therebetween, within the tube interior. Splines or ribs 64 are not essential, but they do serve to center the mating tube 67 on the lug plug, and thus provide a uniform adhesive thickness that insures the formation of a smooth exterior surface, free of projections at the tube-lug interface or joint 61. The centering action performed by splines or ribs 64 is illustrated best in FIG. 13.

The Formation Of The Frame Lugs

The precured lug components 31, 32, 36 and 41 are formed in matched female tooling molds. For example, mold type tooling 70 for use in forming the head lug 31 is shown in FIG. 16. Tooling mold halves 71a and 71b are shown hinge coupled at 72 along their edges to close together for forming the mold cavity therein that is the shape of the exterior surface of the head lug 31. The mold type tool 70 may include clamps, or the like structure, for closing and locking the mold halves 71a and 71b together, and may include a handle 73 to simplify closing and opening of tool 70. Pins 74 are preferably provided in the face of mold half 71a for, when the mold halves 71a and 71b are closed together, with pins 74 fitting into the respective holes 75 formed in the other mold half 71b, for providing proper registry of such mold halves with respect to one another. The mold type tooling employed to form lugs 32, 36 and 41 is similarly arranged, with the mold cavities for the mold type tooling for the respective lugs 32, 36 and 41 being shaped to form the respective lugs 32, 36 and 41.

In practicing the invention, the precured lugs 31, 32, 36 and 41 are each formed from at least a pair of preimpregnated composite preforms in sheet or mat form (though such lugs, respectively, could be formed from a single sheet or matt of adequate length, if so desired). For example, FIG. 15 shows the head lug component 31 as formed from two preimpregnated composite preforms 76 and 77 that are of sheet form, with such preforms being preferably formed, as illustrated in FIG. 18, by over-laying a number of layers or plies of the composite material 78 into a generally rectangular stack 79, wherefrom the individual preforms 76 and 77 are formed by being cut from a stack 79 of same. The individual layers 78 each comprise a multiplicity of small diameter fibers of 100% carbon in the preferred embodiment (though such fibers may be of any type consistent with the invention) that are held together by epoxy resin that is uncured, with the fibers of each sheet having one of the orientations suggested in FIG. 18 and oriented so that the fibers of adjacent sheets are in crossing relation. A preferred orientation of the fibers of each of layer 78, relative to the other layers of an eight layer stack 79, is shown in FIG. 18 as forty five (45) or ninety (90) degrees between each layer, forming the generally rectangular stack 79. Preforms 76 and 77 are then suitably cut out of this stack 79 to the final desired preform shape that depends on the specific lug that the respective sets of preforms 76 and 77 are to form. Each preform 76 and 77 is then inserted in each mold half of the mold tooling 70 that is to form a specific lug, for instance mold halves 71a and 71b where lug 31 is to be formed, with the respective preforms being sized such that each forms exactly one half of a lug plus an overlapping portion that forms a lap edge 80 on the other lug half, as illustrated in FIG. 6A. The preform with the lap edge 80 is identified as the lap preform, and for example, preform 76 is shown in FIGS. 6A, 6B, and 6C, as having opposed lap edges 80 arranged under the respective edges of preform 77. The respective lap edges 80 are generally sized to overlap roughly ten (10) to twenty (20) times the laminate thickness, or roughly three-eights (3/8) inches.

While FIG. 18 shows the specific shaping of preforms 76 and 77 to make lug 31, it is to be understood that similar pairs of preforms 76 and 77 are to be appropriately shaped for making lugs 32, 36 and 41, as are the cavities of the tooling to be thereby employed (which tooling otherwise may be the same as shown in FIG. 16).

The preforms 76 and 77, prior to arrangement in each mold half, for instance the mold halves in the case of lug 31, 71a and 71b, are arranged around an internal pressure bladder 81 (see FIG. 6B), with the lap edges 80 of preform 76 lap edge fitted over the edges of other preform 77, for installation between the mold halves, that are then closed, as shown in FIG. 6B. The tooling mold for the respective lugs is then inserted into a suitable press that clamps the two mold halves tightly together, after which the clamped tooling in cold assemblage has heat suitably applied thereto. During such heat application to the clamped together tooling, the internal pressure bladder 81 is inflated, as shown in FIG. 6C, to apply pressure to the laminate preforms 76 and 77, forcing them against lug external shape defining surfaces of the walls of the mold halves defining the mold cavity, for instance the cavity defined by mold halves 71a and 71b in the case of lug 31. Thereafter, the closed tooling is sufficiently heated to cure the laminate preforms into the lug component to be formed by the particular tooling involved.

The bladders 81 thus serve as internal compaction devices that perform their shaping function prior to the curing of the mats defined by preforms 76 and 77.

The precured lug components of the invention, which are thus cured prior to assembly with the frame tubes to form frame 30, are shown herein in completed, cured form as not containing an internal compaction device, such as bladder 81. The internal compaction bladder 81 or its internal compaction equivalent, in the practice of the method of the invention, is arranged to be and is preferably removed after cure and before assembly of frame 30. While a wide range and number of types of internal pressure bladder devices can be used in practicing the invention, the best results have been found to be obtained when using either a formed rubber bladder or a heat sealed thermoplastic film bladder. For an example of such a bladder, that can be either a rubber bladder 82 or beat sealed thermoplastic film bladder 103, see FIGS. 21 and 22, respectively.

The bladders 82, 103 in accordance with the invention, are constructed to be capable of accommodating a very high pressure of air or other gas, or a suitable liquid, introduced therein, for internally compacting the preform laminates against the tooling mold opposing surfaces that define the respective tooling mold cavities. In practice, for each internal compaction device, the bladders 82, 103 are preferably pressurized to 200 psig. or greater, and after deflation of same, such bladders are removed from the formed lug component involved, and reused in a similar manner. The individual bladders 82, 103 are constructed, in accordance with the invention, to be stable when pressurized to as high a pressure as is required to obtain a lug component having an acceptably high shear and compression strengths at its plug section base, while still minimizing weight, such as the aforementioned pressure of 200 psig or greater.

The bladders 82, 103 are shown in FIGS. 21 and 22, respectively, are shaped to also conform internally with the mats or layers applied to a tooling mold for forming lug 41; however, it is to be understood that similar bladders 82, 103 are to be shaped for such internal conformation with mats or layers applied to a tooling mold for forming lugs 31, 32, and 36. As so arranged for the purpose of forming the external surfacings of respective lugs 31, 32, 36 and 41, such bladders are required to expand only minimally to easily conform to the respective lug inner surfacings involved, and to apply the required internal compaction pressure against the preform internal surfaces, allowing high compaction pressures to be applied to the inside of the particular laminate involved in the curing process. Where earlier composite molding arrangements have utilized lower pressure elongation thermoplastic bladders, such bladders could not conform to the inside shape of the lug, and therefore failed to supply a uniform compaction pressure, and even failed to supply any pressure to some areas of the item being molded. These bladders are called nonconformable bladders, and they are restricted to low inflation pressures because at higher pressures they burst. In the areas where the nonconformable bladder cannot conform to the interior surface of the part, the pressure load is entirely carried by the bladder itself, rather than the pressure load being transferred from the bladder through the part being formed into the female tool. The bladder material will fail in these areas if subject to higher pressures. Such nonconformable bladders, as they were restricted to low inflation pressures, provided greatly lower laminate internal compaction pressure. The use of low inflation pressures and nonconformable bladders produced items that lacked a uniform wall thickness and had a relatively high proportion of resin and voids in the laminate. Such lack of uniform wall thickness, in turn, created points of stress concentration in the item where failure would occur during use. The high resin content and high void content worsened this problem.

A variety of processes can be employed for fabricating both the formed rubber and thermoplastic film bladders 82, 103, as described, that are preferably used in a practice of the lug fabrication method of the invention. For the formed rubber bladder, such processes include conventional rotational molding inside female tooling. A formed rubber bladder can also be sprayed or cast over a mandrel that is shaped to the inner dimensions of the bladder, with the inner mandrel then being either dissolved or melted out, leaving the bladder intact. Such specialized bladders are intended to be removed from the individual lugs and reused.

Heat sealed thermoplastic film bladders can be fabricated in a process that is similar to that being currently used for industrial heat sealing of thermoplastic film, forming, for instance, a bladder 103 shaped as shown in FIG. 21 prior to attachment to the sprue and inflation. Thermoplastic films used for lug component fabrication are to be selected so as to withstand the elevated curing temperatures used, and accordingly, a heat sealing process as used to form the bladder 82 must be such as to handle such higher temperature films. It is therefore desirable, to so form the bladders used in accordance with the present invention, to select thermoplastic films which do not adhere to the composite material during cure so as to allow for removal of the bladder, thereby permitting even a thermoplastic film bladder to be used several times. However, the low cost of such thermoplastic bladders also justifies its being economically discarded after a single use.

As shown in FIGS. 21 and 22, as an example, a bladder sprue 83 is provided for attachment to the bladder 82 at a neck 84; sprue 83 provides a coupling end 85, for connecting that bladder 82 to a pressure source. As so arranged, a gaseous or fluid medium can be used to fill the pressure bladder 82. Air or nitrogen is conveniently used to achieve pressures within the bladder 82, of at least 200 psig. and up to 250 psig., as air or nitrogen do not require clean up during or after use. The foregoing data of this paragraph is also true for the bladders employed for the other lugs of this invention.

FIG. 14 shows two mold halves 90a and 90b of a mold type tool 89 used for lug 36. The tool 89 halves function like the described head lug mold halves 71a and 71b of FIG. 16. However, bottom bracket lug tool 89 also requires a use of a third tool piece 91, which is detailed in three views in FIGS. 14A, 14B, and 14C. Third tool piece 91a fits into cavity 91b, half of which cavity resides in mold half 90a, and half of which cavity resides in mold half 90b. Third tool piece 91 is used to form the surfaces between the chain stay receiving lug component plugs 60 of bottom bracket 36. Additionally, in one embodiment of the present invention, preform 36c, which is shown in three views in FIGS. 14A, 14B, and 14C, may be applied to third tool piece 91, before said third tool piece 91 is placed into the cavities 91b of mold halves 90a and 90b. After curing of bottom bracket 36, preform 36c provides reinforcement to the area between the chain stay receiving lug component plugs 60.

In general, all the lugs of frame 30 are molded so as to be slightly longer than their finished lengths; after molding (and curing), the respective lugs are then trimmed to their final dimensions. In general, one-eighth (⅛) of an inch is trimmed off each lug cylindrical plug end from its as molded length. While such trimming operations are preferred but are not essential, they do result in a slightly lighter lug component than the corresponding lug which emerges from the mold, thereby also simplifying the molding operations as the tolerances of finished lug component do not have to be as precise as the finished lug component.

After the respective lugs are formed (and precured) and they are removed from the respective mold type tools therefor, a secondary drilling operation is performed on the bores of the respective lugs to form the precise internal dimensions thereof as are needed to adhesively bond the various head, bottom bracket, seat and monostay yoke sleeves 44, 45, 46, and 47 respectively therein. Such secondary drilling operation is not necessary if the indicated sleeve inserts are bonded into the indicated lugs during the molding thereof, or if the sleeve inserts are not used.

Preferably, for this invention, the head, bottom bracket, seat and monostay yoke sleeves 44, 45, 46 and 47 are secondarily bonded to the inside of the lug components. Such bonding can be accomplished utilizing a two part epoxy adhesive that preferably involves two fluid components that are mixed and will then harden at room temperature; if desired, a secondary elevated temperature cure may be used on such adhesive to accelerate the curing process. In general, the lug surfaces to which such two part adhesive will adhere should be abraded and cleaned, as with a solvent, prior to bonding. Additionally, as desired, a standard industrial chemical surface treatment may be used on the metallic components for producing a higher strength bond.

The Formation Of The Frame Tubes

In practice, several different processes can be used in the formation of the tubes used in frame 30. The process used in the preferred embodiment of this invention for the frame three main tubes 33, 34, and 35 and seat stays 40 is commonly used in industry, but a description of the process is included for purposes of completeness, and because derivative processes are used for other aspects of this invention. The preferred procedure set out below was selected as the lowest cost method for producing a high quality of tube preferred for use in fabricating frame 30. Such preferred method, as used in the composites manufacturing industry, is commonly known as a "mandrel-wrapped tube" process, and is illustrated in FIG. 17, as utilizing a hard cylindrical metal mandrel 94 that is externally sized to form the inner surface of a particular finished composite tube. In this connection, utilization of a hard mandrel insures that the inside of the resulting finished tube will have a very precise inner diameter, which aids in forming the high strength tube-lug joints 61 of the invention.

For providing such high joint strengths, precise dimensional control of the adhesive thickness between the lug plug or male member and tube interior at a joint 61 is required. Such precise dimensional control is maintained both by controlling the tube inner diameter accurately and closely controlling the lug plug outer diameter.

Forming a particular tube 67, as shown in FIG. 17, involves wrapping layers of the basic composite material 95 employed around the metal mandrel 94 that has previously been coated with a mold release agent that allows for endwise removal of a finished tube therefrom. The layers 95 of composite material are wrapped on the mandrel 94 in a selected sequence and at fiber angles (for the aforementioned fiber contact of adjacent layers) so as to produce a particular tube 67 having a desired configuration. As illustrated in FIG. 17, one layer 95 is wrapped on the mandrel at a time. The size and shape of the two dimensional sheet of composite material 95 is selected to form a complete layer that will fully cover the previous layer. In practice, the greater pressure that is applied in the wrapping process will result in a correspondingly stronger finished tube 67.

With all the needed composite layers 95 applied to the mandrel 94, as shown in FIG. 17, at the angles shown (+45 and −45 degrees), a conventional "shrink" tape 96 (a suitable plastic material) is then wound tightly around the outside of the wrap of composite layers. Several layers of the tape 96 may be so used, after which curing heat is suitably applied thereto. The tape 96 is preferably a tape of the type that will shrink when heated to both cure the tube and create a pressure that is normal to the surfacing of the composite, and will, accordingly, supply the necessary compaction pressure to that composite during such tube cure.

Thereafter, the shrink tape 96 wrapped therearound is pulled off the resulting tube 67. The shrink tape is preferably quickly removed from the tube outside, as for instance by using stripping machinery. The exterior of the resulting tube 67 is then machined to remove a small amount of material only as needed to obtain a precise design dimension outer diameter. Such machining of the tube surface normally is required as the shrink tape 96 will not precisely control the tube outer diameter. In practice, the tube outer diameter is preferably ground utilizing a standard centerless grinding process for grinding the tube 67 to a precise diameter.

While other processes for forming the tube 67 are available, including a process similar to that described for forming the lug components of the invention, the process described above is preferred. Such above described process for forming tubes 67 is also preferred for forming the conical seat stays 40, except that the finishing of the outer surface of stays 40 is complicated by their taper. The chain stays 38 can also be formed by a process that is similar to that described above for forming tube 67, except that the compaction provided by the shrink tape 96 is preferably replaced by a use of an external pressure bladder and a small autoclave, or a like arrangement. A use of such pressure bladder for applying compaction pressure is required due to the change in curvature of the chain stay 38 circumference that produce a change in pressure around its circumference, if shrink tape is used for compaction. The change in curvature of the circumference varies the compaction pressure which is supplied by the circumferential tension in the shrink tape. This variation in pressure will create large variations in wall thickness around the chain stay circumference, absent the application of an external (autoclave supplied) compaction pressure during cure. Although tolerable, this variation in wall thickness is not desirable. In general, a small autoclave is used to supply the pressure. The use of autoclaves to cure high performance composite structures is the most common fabrication technique used in the aerospace industry.

Preferably, the external pressure bladder consists of a flexible rubber bladder or bag which has been formed previously to conform relatively closely to the outside dimensions of the tube being formed, although a loose fitting high temperature thermoplastic film can also be used. The rubber bladder is sealed with the tube inside it, and a vent line is attached to the rubber bladder to vent the space inside the rubber bladder to the outside of the autoclave. This vent line can then either be vented to atmospheric pressure or connected to a vacuum pump. The air pressure inside the autoclave is then increased to a value between 35 psi. and 125 psi., and heat is applied to raise the temperature of the tube to the desired cure temperature. The pressure differential between the inside of the autoclave, and the area inside the sealed rubber bladder which is vented to the outside ambient pressure, supplies the compaction pressure needed during cure.

Generally, only the dimensions of one surface of a composite part can be accurately controlled during its manufacture. This is particularly the case when complex geometries are involved, such as are involved in a formation of a lug component like those of the invention. Where, however, a part involves relatively simple geometries, such as a cylinder, the dimensions on both sides of the laminate can be controlled to close dimensional tolerances. Even so, close dimensional control is preferably achieved in the present process by secondary machining of the tube outer diameter. For proper joint construction, close dimensional control of the adhesive thickness is required for high strength. In practice, the required dimensional tolerances on the adhesive thickness are in a range of between three thousandths (0.003) to nine thousandths (0.009) of an inch. In practice, close dimensional control of the tube and lug components, for mating to one another, is achieved by the present process, in which process it has been found that it is possible to tightly control composite tube dimensions. By manufacturing the lug components of the invention in matched female molds or tooling such as that illustrated, the outer dimensions of the resulting finished lug can also be controlled to very tight tolerances. For a male plug 60 formed on a lug component to fit inside a mating tube 67, as shown in FIGS. 12 and 19, the thickness of an adhesive layer applied therebetween will be held to close tolerances. In the present invention, the practice of forming the respective lug components in female tooling with bodies 60, as shown, such bodies 60 will snugly fit inside the mating tube ends, providing high joint strengths.

The monostay yoke lug 41 is distinctly different than the other lugs because its upper end resembles the end of a tube prior to bonding with the aft plug on the seat lug 32. The upper end of the monostay yoke is machined to resemble the end of a typical mating tube 67 complete with the end edge of tube 68.

In the preferred embodiment of this invention an additional patch or layers of composite material 78 are added to the monostay yoke preform at the upper end of the preform. This allows a cylindrical hole to be bored out to the correct finished inner diameter in this end of the monostay yoke 41 without removing any portion of the lap edge of the preform 80. The additional material may not be required to produce a frame of average strength and additional weight savings can be achieved by eliminating it.

After the initial fabrication of the lug components and tubes, and their subsequent trimming, tapers are added to the tube ends. Then the various surfaces which will be adhesive bonded are cleaned by means of grit blasting or hand sanding to remove any mold release agents or other contaminants. Preferably, a two part epoxy adhesive is used for this bonding purpose, with the two fluid components being mixed together and are then applied to the lug and tube surfaces being bonded. The various lugs and tubes that form the frame joints 61 are then fitted into one another until all the joints 61 are fully formed. As described above, with respect to FIGS. 12, 19 and 20, the splines or ribs 64 and vertical step 63 are provided at the joint plug 62 base to ensure that the components will be correctly aligned. A clamping fixture (not shown) is then attached to the frame. The clamping fixture holds the head lug 31, the seat tube 35, and the rear dropouts 39A and 39B in precise alignment with one another until the adhesive hardens. A preferred adhesive for a practice of this invention is one that will harden at room temperature. However, a secondary elevated temperature cure may also be employed to accelerate the curing process.

Hereinabove are set out a description of the precured component lugs and tubes of frame 30, and particularly the configuration of the male or plug members of such lugs, and the tube ends. Such lug plugs and tube ends are for adhesive bonding into the all-composite light weight, strong and stiff bicycle frame 30. Preferred methods and arrangements for the formation of such lugs and tubes have also generally been set out, as have the composites and their use for producing same.

The monostay yoke lug 41 to seat lug 32 joint illustrates a derivative construction technique which can be used to construct the frame and is covered by the disclosures of this invention. The construction will become readily apparent to the reader in the following description.

This frame construction utilizes tubes 104 constructed with ends containing the plug 60 portion of the joint. The lugs are constructed without the plug ends and the ends of each tube stub on the lugs are machined to accept the plug ends on said tubes.

Several techniques have been developed to fabricate such tubes. The first technique utilizes a process directly analogous to the lug fabrication process. A matched female mold is constructed for the tube with the plug ends. The process then uses two preforms and a internal pressure bladder identical to those used for lug construction. The preform used in this process has been named the lapped tube preform because its utilizes two laps.

Another method has been developed for constructing the preform for this process. The preform is constructed in one piece around a cylindrical bladder. This preform is one piece and circumferentially continuous, hence it has been named the continuous tube preform. The preform is thus essentially a cylindrical one having an outer circumference similar to the outer circumference of the finished tube and a similar length. The preform is constructed similar to the process previously described to construct the three main tubes 33, 34, and 35. The layers 95 of composite material are wrapped on the mandrel 94 in the previously described sequence. The tube which has been wrapped onto the mandrel, is then removed from the mandrel, and the shrink tape 96 is not used in this process. A long cylindrical bladder is then inserted inside the tube preform, and this assembly is placed in the matched female mold for curing similar to the lugs. In practice, a straight cylindrical preform can be used without the diameter difference between the plug ends and the tube causing unacceptable distortions in the laminate. This is partially a result of the preferred orientation of the layers used in the tubes, which consists of all zero (0) or forty five (45) degree layers which can expand somewhat circumferentially to conform to the different diameters. The advantage of this preform over the use of two separate preforms is that the circumferential fibers are continuous between the two halves of the tube, the tube becomes perfectly axisymetric about its centerline.

It is also, of course, possible to wrap the layers 95 of composite material onto a hard mandrel 94 which has a different smaller diameter at the ends where the plug will be located. The mandrel 94 will consist of multiple pieces in this case to allow it to be removed from the inside of the preform. For example, the mandrel assembly may consist of a cylinder with an outer diameter sized correctly for the plug area on the tube ends, plus cylindrical tube which slides over the middle portion of the cylinder whose outer diameter is sized correctly for the middle area portion of the tube, such cylindrical tube component being radially segmented into three longitudinal sections. After wrapping of the layers 95 of composite material on said mandrel assembly, the inner cylinder is first removed, and then the three segmented portions of the cylindrical tube mandrel component are removed.

Still another technique can be used for constructing the preform which utilizes a preform similar to the lug preforms 76, 77 which are cut from a rectangular stack of composite material. A single primary preform is cut from a rectangular stack of composite material. The preform shape and size is constructed such that it can be wrapped around the hard mandrel 94 several times. The resulting preform resembles a jelly roll in the general nature of the wrapping nature of the preform, hence the technique has been named the jelly roll technique. The preform can consist of a little over one wrap, in such case the preform would be approximately three hundred eighty (380) degrees long as measured from start to finish on the hard mandrel 94. The preform constructed with this technique is in essence intermediary in complexity and performance to the continuous tube preform and the lapped tube preform. The jelly rolled preform has essentially one lap in total, that is one location where the circumferential fibers are discontinuous.

This technique has been used to construct tapered tubes and tubes with elliptical cross section such as the seat stays and chain stays. The process can also be used to construct curved tubes, such as the fork blades.

Preferred Specific Features Of The Invention

In practicing the invention, the lug component preforms 76 and 77 are employed, with such lug preforms being specifically shaped as dictated by the specific lug components to be formed (as already indicated). The material which is used to form the composite lugs of the invention is a unidirectional graphite epoxy-preimpregnated material. In one embodiment of this invention, the material used is product number NCT-200-7-G150-24 from Newport Adhesives and Composites Inc., located in Fountain Valley, Calif.

FIG. 18 shows a stack of eight (8) individual ply or layers 78 forming the stack 79, wherefrom such preform or preforms are cut in the sets thereof that are indicated. FIG. 18 shows for disclosure purposes a guidance plate 90 whereon arrows are shown representative of preferred orientations of the primary fiber directions of composite layers 78, which primary fiber angulations are also shown in a column adjacent to the individual layer 78 ends. Such fiber orientation is to cross from layer to layer, for example: a zero (0) degree orientation for a top layer; a forty five (45) degree orientation for a next layer; a minus forty five (−45) degree orientation for the next layer; a ninety (90) degree orientation for a following layer; a zero (0) degree orientation for the following layer; a forty five (45) degree orientation for the subsequent layer; a minus forty five (45) degree orientation for the next to last layer; and a ninety (90) degree orientation for a last layer. The fiber angular relationships are with respect to some reference datum direction. FIG. 18 shows a layout of eight (8) layers, but it should be understood, a number greater than or less than eight (8) layers can be so arranged as preform stack 79. A twelve (12) ply laminate, for example might be used in the head lug 31 that needs to be stronger due to the higher stresses present therein, as compared to the stress anticipated to be exerted on the other lugs. Eight (8) ply laminates, however, are generally adequate for the other lugs due to the relatively lower stresses such lugs are subjected to, as compared to the head lug 31.

The individual layers 78 contain a mass of unidirectional one hundred percent (100%) carbon fibers of small diameter, preimpregnated with epoxy resin at a ratio to one another of approximately thirty eight percent (38%) by weight. Each layer 78 has a cured thickness equivalent of approximately five thousands (0.005) of an inch. Several different suppliers of carbon fiber and epoxy resin are commonly available to supply preimpregnated material which will meet the processing and structural requirements of this invention. The carbon fiber that is used is preferably a standard aerospace grade fiber with an extensional modulus of thirty one (31) to thirty five (35) msi., and has an ultimate tensile strength of approximately three hundred fifty (350) to seven hundred fifty (750) ksi. An example of such a carbon fiber is manufactured by Hercules Incorporated, located in Magna, Utah, known as AS4 carbon fiber. Another example of such a carbon fiber is manufactured by Toray Industries, Inc., located in Tokyo, Japan, known as T700 carbon fiber. Another example of such a carbon fiber is manufactured by Courtaulds Grafil, Inc., from Sacramento, Calif., known as Grafil 33-500.

The prepreg material preferred for use with the invention will generally be supplied with a fiber areal weight of approximately one hundred fifty (150) gr/m2, which fiber weight will produce on equivalent of a little under five thousandth (0.005) of an inch when fiber volumes of approximately sixty seven percent (67%) are obtained. This produces a wall thickness of roughly four hundredths (0.040) of an inch for the wall formed from eight (8) ply laminates and roughly six hundreds (0.060) of an inch for wall formed from twelve (12) laminates. Previous composites have generally only achieved fiber volumes of sixty percent (60%) or less since the manufacturing processes were formerly not capable of reliably applying high compaction pressures during cure, and accordingly, had higher weights and lower strengths.

The epoxy resin that is preferably used in forming layers 78 used in the lug construction would typically use a sporting good grade resin. These resins typically have a suggested cure temperature of two hundred fifty (250) degrees F and cure time of one (1) hour. In general, a range of cure temperatures of between two hundred twenty five (225) degrees F and three hundred twenty five (325) degrees F will be used with these epoxy resins, with cure temperatures between two hundred fifty (250) degrees F and three hundred (300) degrees F being most common. Good results have been obtained in the preferred embodiment of this invention using a range of different cure cycles. These range from one (1) hour at two hundred fifty (250) degrees F to ten (10) minutes at three hundred twenty (320) degrees F. Examples of such epoxy resins include: products numbered NCT-200-7 or NCT-301-5 from Newport Adhesives and Composites Inc., located in Fountain Valley, Calif.; product numbered 1919 from Hercules Inc., in Magna, Utah; and product numbered HYE 48A from Fiberite Division of ICI Composites Inc., located in Greenville, Tex.

Similar composite materials are preferably used for the fabrication of the top, down and seat tubes 33, 34 and 35 respectively, as well as the chain and seat stays 38 and 40, except that a thin layer of fiberglas/epoxy may be used on the outer surface of each tube or stay. For instance, the material which is used to construct the composite tubes of the present invention is also a unidirectional graphite epoxy-preimpregnated material. In the preferred embodiment of this invention, the material used is product number HYE 6048A1B material from Fiberite Division of ICI Composites Inc., located in Greenville, Tex. The prepreg carbon fiber composite material would typically be purchased with a thirty five (35%) percent resin content by weight and one hundred fifty (150) gr/m$^2$ fiber a real weight. Seven or eight plies of such carbon fiber material are preferably used for the tubes and stays, depending on the frame stiffness desired. The orientations of the primary fiber directions in the layers can be, and preferably are, forty five (45) degrees, minus forty five (45) degrees, zero (0) degrees, zero (0) degrees, zero (0) degrees, forty five (45) degrees, and minus forty five (−45) degrees with respect to the tube centerline direction for a seven (7) ply laminate, with the wall thickness of such seven (7) ply laminate being roughly forty four thousandths (0.044) of an inch. The orientations of the primary fiber directions in the various layers of eight (8) ply composite materials can be, and preferably is, like that for the seven (7) ply laminate, except that an additional zero (0) degree orientation layer is included as a center layer, with such orientation being with respect to the tube centerline direction. The wall thickness of eight (8) ply tubes will be roughly forty nine thousandths (0.049) of an inch, which thickness is relatively larger than the typical 8 ply lug thickness due to the fact that the shrink tape manufacturing process produces less compaction pressure than is present in the lug fabrication process. The seat stay 40 also preferably utilizes a seven (7) ply laminate as described above, and the chain stays 38 preferably utilize an eight (8) ply laminate.

The cure temperature and times specified for the lug curing are also applicable to the tube fabrication, except that care must be exercised to ensure that the tube temperature is used to control the cure time, since significant temperature differences can exist between the oven or autoclave and the tube. The preferred shrink tape is a combination of two tapes manufactured by Richmond Division of Dixico Inc., Redlands, Calif. The tapes are distributed by Technology Marketing Inc., Salt Lake City, Utah. One or more layers of E-3760 is wrapped on first as a release tape and then one or more layers of "Hi-Shrink Tape #2" are then wrapped on to provide more compaction. An alternate source of shrink tape is Airtech International, Carson, Calif. One or more layers of "Wrightlon 4500" is wrapped on as a release tape, this is available from International Plastics Division of Airtech International in Carson, Calif., and then one or more layers of "A575 Hi-Shrink Tape" is wrapped on to provide more compaction, this is available from Airtech International, Carson, Calif. Another alternative source to this tape is "SuperTape" available from Century Design Inc., San Diego, Calif.

For the frame 30 of the invention, an outer tube diameter of 1.625 inches is preferably used as the down tube 34 diameter (which down tube is thereby oversized relative to metal tubed frames and metal lugged composite tubed frames, where larger tubes would involve larger lugs or lug components, adding unacceptable weight). An outer tube diameter of 1.5 inches is preferably used as the seat tube 35 as well as the top tube 33 (which tube outer diameter is also oversized relative to metal tubed frames and metal lugged composite tubed frames). The larger diameter tubes that are preferred for the present invention do not create an unacceptable weight addition and are desirable in that they produce a more efficient structure that is stiffer and lighter than a smaller diameter metal tubed bicycle frame. Similarly, the chain stays 38 and seat stays 40 are relatively larger in size than stays that have been most commonly used for metal tubed frames and metal lugged composite tubed frames. The chain stays 38 utilize major and minor outer diameters of 1.2 inches and 0.800 inches, respectively at their large elliptical ends and an outer diameter of 0.652 inches at their smaller circular ends. The seat stays 40, in turn, each incorporate an outer diameter of 0.840 inches at their large ends and 0.590 inches at their small ends.

In practice, it is preferred that, where the respective lugs are bonded to a tube, a nominal design bondline for the adhesive have a thickness of 0.006 of an inch. To provide for this adhesive thickness, a nominal design height of spline or rib 64 of four thousandths (0.004) of an inch is preferred. For further providing a desired strength of joint 61, the length of the conical section of the lug plug surface that contacts the corresponding taper length of the tube for forming a contact coupling is preferably approximately one quarter (¼) of an inch. In practice, the length of the cylindrical or straight elliptical sections of the lug plug's male members forming the lug and tube frame joints is preferably equal to one half (½) the major tube outer diameter, which for the frame 30, is 1.625 inches. As to the adhesive itself, the material which is used to bond the tubes to the lugs to form the frame of the present invention is a two-part epoxy adhesive. In the preferred embodiment of this invention the material used is Hysol 9430 from Dexter Corporation, Pittsburg, Calif.

A bicycle frame 30 that is constructed utilizing the procedures, materials, and geometric designs of the present invention is an exceptionally light, strong, and stiff frame, as compared to previous composite bicycle frames.

Thus, frame 30 is a frame that is the lightest weight production bicycle frame in the world, and it is stiffer than existing composite frames that use metallic lug components, and one piece composite frames.

The lower weight of frame 30 combined with its higher stiffness and strength is due, in part, to the high laminate quality that is obtained when the lugs are fabricated individually, as taught by the present methods. Such higher laminate quality results in higher laminate strengths and stiffness for a given laminate weight. Such higher laminate quality is produced when the higher compaction pressures of this invention are used in fabricating the lugs herein disclosed.

The lower frame weight for frame 30 coupled with its higher stiffness and strength characteristics are also due, in part, to the high strength of joints 61 as formed by the practice of the invention. Further, joints 61 do not require additional reinforcement relative to the rest of the lug to provide the required design strength. Higher joint strength is further provided by the tapered conical bonded joint involved, and the larger tube diameter that reduces bondline stresses and line load that are transferred through the joint. The higher joint strength is also due to the higher shear strength and compression laminate strengths that are provided with the higher laminate compaction pressures of this invention. Also, with the larger tube diameters and correspondingly larger lug cross sectional areas, stronger joints are achieved. Further, such larger diameters and cross sectional shapes are more efficient for carrying torsional and bending loads, and they also make it possible to use less material in their manufacture while obtaining the same structural strength and stiffness.

While a preferred frame 30, processes for making same, and the processes for making the frame components and their connection into a light weight, strong and stiff frame have been shown and described herein, it should be understood that the present disclosure is made by way of example only, and that variations and changes thereto are possible without departing from the basic invention involved.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention. For example, those skilled in the art who have the disclosure before them will be able to envision a variation in which the tubes of the bicycle frame are made by a high pressure bladder acting inside a female mold, which is the method disclosed in the description of lug manufacture, while the lugs of the bicycle frame are made by means of an external pressure bladder and an autoclave acting against a hard internal mandrel, which is the method disclosed in the description of chain stay manufacture. The resulting parts, lugs and tubes would be fitted together by means of plug ends on the tubes inserted into matching holes in the lugs.

What is claimed is:

1. A composite light weight vehicle frame, comprising, a plurality of composite tubes disposed in spaced frame defining configuration and joined by a plurality of thin single wall, hollow, low void, all composite lugs, said lug wall consisting essentially of a plurality of fiber laminations in a substantially solid, cured resin matrix.

2. The frame of claim 1, wherein
   each said tube includes a plurality of tube ends, and each said lug includes at least one plug, each said plug formed and arranged to be closely received within a respective one of said tube ends and the respective tube ends are anchored to the respective lug plugs that are received in said tube ends.

3. The frame set forth in claim 2, wherein: at least one of said plugs of said lugs comprises a substantially cylindrical body that at one end of same has an annular conical stop section and that includes means for uniformly spacing formed on said body for spacing the body and the tube end relative to one another when the frame is assembled.

4. The frame set forth in claim 3, wherein: the respective ends of said tubes are proportioned to closely fit against the respective lug plug stop sections in centered relation thereabout.

5. The frame set forth in claim 3, wherein:

said uniformly spacing means comprises spaced splines formed in the respective plugs at spaced intervals about said body.

6. The frame set forth in claim 5, wherein:

said splines have a height sufficient to provide for uniform coverage by an adhesive and sufficient thickness for said adhesive to cure to a substantially solid joint between said lug and tube, said bonding means comprising a curable, high performance adhesive that forms said joint.

7. The frame set forth in claim 1, wherein:

said lugs and said tubes form a bicycle frame including a head lug, bottom bracket lug and a seat lug;

said bicycle frame being adapted to operationally receive a bicycle handle bar, a pedal mechanism, and a seat post, wherein said head lug is adapted to receive said handle bar, said bottom bracket lug is adapted to receive said pedal mechanism, and said seat lug is adapted to receive said seat post.

8. A fiber reinforced plastic load bearing vehicle frame comprising:

a thin single wall hollow lug having a first cylinder portion having a first axis and a second cylinder portion having a second diverging axis projecting at an angle from said first axis of said first cylinder portion said second cylinder portion being formed and arranged for receiving a tube;

said second cylinder portion merging with said first cylinder portion at a compoundly curved wall portion and having a connecting portion formed and arranged for receiving said tube, said tube connected to said second cylinder portion at said connecting portion and said tube extending in a direction coaxial with said second axis;

said connecting portion being spaced from said first cylinder portion such that said connecting portion is spaced away from the location of stress concentration on said lug when said frame is under riding load imposed by operation of said vehicle frame tending to change said angle and is spaced in the direction away from said first cylinder portion to substantially decrease said stress on said connecting portion;

said thin single wall being defined by an interior surface and an exterior surface, and formed substantially exclusively of a plurality of fiber reinforcing layers in a cured resin matrix between said interior and exterior surfaces.

9. The vehicle fame of claim 8, wherein said second cylinder is faired into said first cylinder so as to form a smooth and continuous load bearing fillet therebetween.

10. The vehicle frame of claim 8, wherein said lug comprises an optimum compaction, low void lamination of fiber reinforced plastic layers.

11. A lug for joining tubes comprising:

a first single walled hollow tubular structural member having a first interior surface and a first exterior surface;

a second single walled hollow tubular structural member extending outwardly from said first tubular member having a second interior surface and a second exterior surface, said second interior surface being a continuation of said first interior surface and said second exterior surface being a continuation of said first exterior surface;

said first tubular member and second tubular member being formed in a single substantially homogenous section hollow structural unit of cured fiber reinforced plastic lamina having reinforcing fibers within a plastic matrix;

said lamina being compacted one against another prior to curing, whereby voids between the lamina are substantially eliminated.

12. The lug of claim 11, and:

said lamina being a plurality of unidirectional sheets of fibers;

said unidirectional sheets having said fibers being oriented in a biased manner with respect to one another prior to curing and substantially the same orientation being maintained after compaction and curing.

13. The lug of claim 11, and:

said second tubular member being formed and arranged so as to mate with and being bondable to a structural tube at a tube-lug joint.

14. The lug of claim 11, wherein:

one of said second tubular member or said tube having a plug extending from an annular bevel and longitudinal splines circumferentially arranged thereon and the other of said second tubular member or said tube having a receiver formed therein for mating with said one of said second tubular member or lug.

15. The lug of claim 11 further comprising:

said lug having a fiber volume within a sectional area defined by said interior and exterior surfaces comprising of greater than sixty percent (60%).

16. The lug of claim 11, wherein:

said lamina are overlapped to create said lug;

said lamina comprises between about six and thirteen unidirectional fiber layers for substantially the entire wall;

said lamina overlapping at a single overlap on a plane through said lug; and said wall being reinforced at high load locations by additional lamina.

17. A composite lug and composite tube vehicle frame comprising:

a composite lug including a solid shell of a single continuous wall having an interior surface and an exterior surface and having a first hollow tubular portion;

said lug shell having a second hollow tubular portion extending outwardly from said first tubular portion;

said first tubular portion and second tubular portion being formed in a single structural unit of cured fiber reinforced plastic lamina, said fibers being contained within a substantially homogenous resin matrix;

said lamina being compacted one against another prior to curing, whereby voids between the lamina are substantially eliminated to provide a fiber volume between said interior surface and said exterior surface greater than 60%;

said lug being bonded to a composite tube to complete said vehicle frame.

18. The frame of claim 17, wherein:

said lamina consists essentially of a plurality of unidirectional layers of fibers said fibers being oriented substantially parallel to said surfaces; and said fibers being orientated in a biased manner with respect to one another.

19. The lug of claim 18, wherein:

said tube being formed from a plurality of second lamina being a plurality of second fibers;

said second fibers being oriented in a biased manner with respect to one another prior to curing and substantially the same orientation of fibers being maintained after compaction and curing.

20. The lug of claim 18, wherein:

said second tubular portion being formed and arranged so as to mate with and being bondable to said tube at a tube-lug joint.

21. The lug of claim 20, wherein:

one of said second tubular member or said tube having a plug extending from an annular bevel and longitudinal splines circumferentially arranged thereon and the other of said second tubular member or said tube having a receiver formed therein for mating with said one of said second tubular member or said tube.

22. The lug of claim 18 further comprising:

said lug being formed of between six and thirteen of said layers.

23. An all composite bicycle frame structural component formed as a hollow shell composed of two half portions, said component comprising:

a shell formed as a continuous wall in a compound curved three dimensional shape, said shell being a solid composite consisting essentially of a plurality of fiber layers in a first half portion having fibers of a first layer oriented in juxtaposed relation to the fibers of a second layer and a plurality of fiber layers in a second half portion having fibers of a third layer oriented in juxtaposed relation to the fibers of a fourth layer, said layers being contained within a cured resin matrix wherein said substantially continuously surrounds said fibers;

said first and second layers of said first half portion being oriented in an overlapping manner with said third and said fourth layers, within said resin matrix;

said shell having an interior surface and an exterior surface with said fibers substantially parallel to both said surfaces and the area between said surfaces consisting essentially of said fiber layers in said resin matrix in substantially uniform density and having a fiber volume between said surfaces of greater than 60%.

* * * * *